US011297502B2

(12) United States Patent
Muhanna et al.

(10) Patent No.: US 11,297,502 B2
(45) Date of Patent: Apr. 5, 2022

(54) METHOD AND DEVICE FOR NEGOTIATING SECURITY AND INTEGRITY ALGORITHMS

(71) Applicant: Futurewei Technologies, Inc., Plano, TX (US)

(72) Inventors: Ahmad Shawky Muhanna, Richardson, TX (US); Xin Zeng, Shanghai (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 457 days.

(21) Appl. No.: 16/120,906

(22) Filed: Sep. 4, 2018

(65) Prior Publication Data

US 2019/0082325 A1    Mar. 14, 2019

Related U.S. Application Data

(60) Provisional application No. 62/556,053, filed on Sep. 8, 2017.

(51) Int. Cl.
*H04W 12/10* (2021.01)
*H04L 29/06* (2006.01)
(Continued)

(52) U.S. Cl.
CPC ............ *H04W 12/10* (2013.01); *H04L 9/0618* (2013.01); *H04L 9/14* (2013.01); *H04L 9/3242* (2013.01);
(Continued)

(58) Field of Classification Search
CPC ..... H04W 12/10; H04W 12/04; H04W 12/06; H04W 12/08; H04W 76/10; H04W 60/00;
(Continued)

(56) References Cited

U.S. PATENT DOCUMENTS

2007/0153793 A1    7/2007  Jiang
2008/0254833 A1*  10/2008  Keevill ................. H04W 24/02
                                                                              455/558
(Continued)

FOREIGN PATENT DOCUMENTS

CN    101174943 A    5/2008
CN    101378591 A    3/2009
(Continued)

OTHER PUBLICATIONS

V. P. Kafle, Y. Fukushima and H. Harai, "ID-based communication for realizing IoT and M2M in future heterogeneous mobile networks," 2015 International Conference on Recent Advances in Internet of Things (RIoT), Singapore, 2015, pp. 1-6, doi: 10.1109/RIOT.2015.7104908. (Year: 2015).*

(Continued)

*Primary Examiner* — Jung W Kim
*Assistant Examiner* — Sameera Wickramasuriya
(74) *Attorney, Agent, or Firm* — Slater Matsil, LLP

(57) ABSTRACT

Embodiments of this disclosure provide techniques for communicating in a wireless communication system. In particular, a user equipment (UE) may receiving a security command message from a base station comprising an indication of an integrity protection algorithm and an indication of an encryption algorithm. The first security command message may trigger a radio resource control (RRC) traffic signaling protection procedure between the UE and the base station. The UE transmits a security command complete message to the base station. The security command complete message may trigger a packet data unit (PDU) session establishment procedure to establish a PDU session between the UE and the base station.

33 Claims, 7 Drawing Sheets

(51) Int. Cl.
| | |
|---|---|
| *H04W 12/04* | (2021.01) |
| *H04L 9/32* | (2006.01) |
| *H04L 9/06* | (2006.01) |
| *H04L 9/14* | (2006.01) |
| *H04W 12/06* | (2021.01) |
| *H04W 12/08* | (2021.01) |
| *H04W 76/10* | (2018.01) |
| *H04W 60/00* | (2009.01) |

(52) U.S. Cl.
 CPC .......... *H04L 63/061* (2013.01); *H04L 63/08* (2013.01); *H04L 63/20* (2013.01); *H04L 63/205* (2013.01); *H04W 12/04* (2013.01); *H04W 12/06* (2013.01); *H04W 12/08* (2013.01); *H04L 2209/80* (2013.01); *H04W 60/00* (2013.01); *H04W 76/10* (2018.02)

(58) Field of Classification Search
 CPC ..... H04L 63/08; H04L 63/061; H04L 9/3242; H04L 9/0618; H04L 9/14; H04L 63/20; H04L 63/205; H04L 2209/80
 See application file for complete search history.

(56) References Cited

U.S. PATENT DOCUMENTS

| | | | |
|---|---|---|---|
| 2012/0039464 A1* | 2/2012 | Xu .................... | H04W 36/0038 380/28 |
| 2012/0315878 A1* | 12/2012 | Deng ................ | H04L 63/12 455/411 |
| 2013/0051288 A1 | 2/2013 | Yamada et al. | |
| 2013/0236016 A1* | 9/2013 | Zhang ................ | H04L 63/205 380/270 |
| 2013/0269001 A1* | 10/2013 | Janakiraman .......... | H04L 43/12 726/4 |
| 2013/0343280 A1* | 12/2013 | Lee .................... | H04W 12/06 370/328 |
| 2016/0014647 A1* | 1/2016 | Yi ..................... | H04W 36/0061 370/331 |
| 2016/0044002 A1* | 2/2016 | Ying ................. | H04L 9/14 713/168 |
| 2016/0219475 A1 | 7/2016 | Kim | |
| 2016/0255675 A1* | 9/2016 | Van Lieshout ....... | H04W 76/25 370/329 |
| 2017/0006469 A1 | 1/2017 | Palanigounder | |
| 2017/0034866 A1 | 2/2017 | Wager et al. | |
| 2017/0311290 A1 | 10/2017 | Adjakple et al. | |
| 2018/0083972 A1* | 3/2018 | Kim .................... | H04L 41/0853 |
| 2018/0249479 A1* | 8/2018 | Cho .................. | H04W 72/1268 |
| 2018/0376384 A1* | 12/2018 | Youn .................. | H04W 8/02 |
| 2019/0246282 A1* | 8/2019 | Li ...................... | H04W 12/1006 |
| 2019/0289571 A1* | 9/2019 | Park ................... | H04W 60/00 |
| 2020/0037151 A1* | 1/2020 | Du ...................... | H04L 1/22 |

FOREIGN PATENT DOCUMENTS

| | | |
|---|---|---|
| CN | 101384079 A | 3/2009 |
| CN | 101552982 A | 10/2009 |
| CN | 102014520 A | 4/2011 |
| CN | 102487507 A | 6/2012 |
| CN | 103220674 A | 7/2013 |
| CN | 104247328 B | 6/2017 |
| CN | 106851856 A | 6/2017 |

OTHER PUBLICATIONS

"3rd Generation Partnership Project; Technical Specification Group Services and System Aspects; Study on the security aspects of the next generation system (Release 14)", 3GPP TR 33.899 V1.3.0 (Aug. 2017) (Year: 2017).*

Bikos, Anastasios N., and Nicolas Sklavos. "LTE/SAE security issues on 4G wireless networks." IEEE Security & Privacy 11.2 (2012): 55-62. (Year: 2012).*

3GPP TS 23.501 V1.2.0; 3rd Generation Partnership Project; Technical Specification Group Services and System Aspects; System Architecture for the 5G System; Stage 2 (Release 15); Jul. 2017, 166 pages.

3GPP TS 33.102 V13.0.0; 3rd Generation Partnership Project; Technical Specification Group Services and System Aspects; 3G Security; Security architecture (Release 13), Jan. 2016, 76 pages.

3GPP TS 33.401 V13.0.0; 3rd Generation Partnership Project; Technical Specification Group Services and System Aspects; 3GPP System Architecture Evolution (SAE); Security architecture (Release 13); Sep. 2015, 131 pages.

3GPP TS 33.501 V0.3.0; 3rd Generation Partnership Project; Technical Specification Group Services and System Aspects; Security Architecture and Procedures for 5G System (Release 15), Aug. 2017, 44 pages.

3rd Generation Partnership Project; Technical Specification Group Services and System Aspects; Study on the security aspects of the next generation system (Release 14), 3GPP TR 33.899, Aug. 2017, 605 Pages, V1.3.0.

Huawei et al., "AP Security Negotiation and Activation", 3GPP TSG SA WG3 (Security) Meeting #88bis, S3-172277, Oct. 9-13, 2017, 6 Pages, Singapore, Singapore.

Huawei et al., "AS Security Negotiation and Activation", 3GPP TSG SA WG3 (Security) Meeting #90, S3-180426, Jan. 22-26, 2018, 3 Pages, Gothenburg, Sweden.

Vencore Labs, et al., "TS 23.502 P-CR concerning use of Establishment Cause in Service Request procedures", SA WG2 Meeting #122, S2-174369, Jun. 26-30, 2017, San Jose Del Cabo, Mexico, 5GS_Ph1 / Rel-15, 6 pages.

Qualcomm Incorporated, "TS 23.502: Procedures for CM-Connected with RRC inactive state", SA WG2 Meeting #122bis, S2-176118, Aug. 21-25, 2017, Sophia Antipolis, France, 5GS_ph1/ Rel-15, 8 pages.

Ericsson, "New requirements for algorithm selection in TS 33.501", 3GPP TSG SA WG3 (Security) Meeting #88Bis, S3-172406, revision of S3-17xabc, Oct. 9-13, 2017, 2 Pages, Singapore.

Huawei et al., "ENDC5 support legacy MME: Delivery UE NR sec. cap. to MeNB in X2 & S1 HO", 3GPP TSG SA WG3 (Security) Meeting #89, S3-173131, revision of S3-17xabc, Nov. 27-Dec. 1, 2017, 4 Pages, Reno, NV, USA.

Huawei, et al., "EDCE5: UE NR Security Capabilities Biddingdown", 3GPP TSG SA WG3 (Security) Meeting #89, S3-173133, revision of S3-17xabc, Nov. 27-Dec. 1, 2017, 4 Pages, Reno, NV, USA.

Qualcomm Incorporated, "Discussion of possible methods and proposed solution for negotiating the algorithms for use between a UE and SgNB in EDCE5", 3GPP TSG SA WG3 (Security) Meeting #88Bis Adhoc, S3-172372, revision of S3-17xabc, Oct. 9-13, 2017, 3 Pages, Singapore.

* cited by examiner

METHOD AND DEVICE FOR NEGOTIATING SECURITY AND INTEGRITY ALGORITHMS

CROSS-REFERENCE TO RELATED APPLICATIONS

This application claims the benefit of U.S. Provisional Application No. 62/556,053, filed on Sep. 8, 2017, entitled "Method and Device for Negotiating Security and Integrity Algorithms," which application is hereby incorporated by reference herein in its entirety.

TECHNICAL FIELD

The present disclosure relates generally to a system and method for wireless communications, and, in particular embodiments, to a system and method for negotiating security and integrity algorithms.

BACKGROUND

Generally, modern wireless networks include various security features meant to prevent unauthorized third parties from accessing the network and/or manipulating data. In particular, Long Term Evolution (LTE) networks provide several basic security features, namely: LTE authentication, non-access stratum (NAS) security, and access stratum (AS) security. The LTE authentication feature ensures that a user is an authorized subscriber to the network (or network service) that the user is attempting to access. The NAS security and AS security features ensure that control and user data communicated over a radio access network (RAN) is secure at the NAS and AS levels, respectively.

SUMMARY

Technical advantages are generally achieved by embodiments of this disclosure, which describes systems and methods for negotiating security and integrity algorithms for control plane signaling and user plane signaling.

In accordance with an embodiment, a method for establishing secure communications in a wireless network is provided. The method includes receiving, by a user equipment (UE), a first security command message from a base station. The first security command message includes at least an indication of a first integrity protection algorithm and an indication of a first encryption algorithm. The first security command message triggers a radio resource control (RRC) traffic signaling protection procedure between the UE and the base station. The method further includes transmitting, by the UE, a security command complete message to the base station. The security command complete message triggers a packet data unit (PDU) session establishment procedure to establish a PDU session between the UE and the base station. In one example, the RRC traffic signaling protection procedure includes negotiating RRC security activation in accordance with the first integrity protection algorithm and the first encryption algorithm. Optionally, in such an example, or in another example, the first security command message further includes an indication of a second integrity algorithm and an indication of a second encryption algorithm. The PDU session establishment procedure further includes negotiating user plane security algorithms for the PDU session in accordance with the second integrity algorithm and the second encryption algorithm. Optionally, in any one of the above-mentioned examples, or in another example, the method includes receiving, by the UE, a second security command message from the base station in response to transmitting the security command complete message. The second security command message includes an indication of a second integrity algorithm and an indication of a second encryption algorithm. The PDU session establishment procedure further includes negotiating user plane security algorithms for the PDU session in accordance with the second integrity algorithm and the second encryption algorithm. Optionally, in any one of the above mentioned examples, or in another example, the method further includes receiving, by the UE, during a subsequent PDU session establishment, an indication of a third integrity algorithm and an indication of a third encryption algorithm in RRC signaling used to configure data radio bearers (DRBs) of a subsequent PDU session. The subsequent PDU session has a corresponding PDU establishment procedure comprising negotiating user plane security algorithms for the subsequent PDU session in accordance with the third integrity algorithm and the third encryption algorithm. Optionally, in any one of the above-mentioned examples, or in another example, the method includes receiving, by the UE, a security policy command from the base station indicating an activation status of user plane encryption and user plane integrity protection for the PDU session. The method also includes activating, by the UE, user plane encryption and user plane integrity protection for the PDU session in accordance with the security policy command. Optionally, in any one of the above-mentioned examples, or in another example, the method includes transmitting, by the UE, a list of algorithms to an access management function (AMF) node. The list of algorithms includes a list of integrity algorithms and a list of ciphering algorithms supported by the UE. Optionally, in any one of the above-mentioned examples, or in another example, the first security command message is integrity protected with an RRC integrity key. Optionally, in any one of the above-mentioned examples, or in another example, the security command complete message is integrity protected with the first integrity protection algorithm as indicated in the first security command message. Optionally, in any one of the above-mentioned examples, or in another example, the security command complete message indicates that the RRC traffic signaling protection procedure has been successfully completed. Optionally, in any one of the above-mentioned examples, or in another example, the first security command message is an access stratum (AS) security mode command (SMC). Optionally, in any one of the above-mentioned examples, or in another example, the base station is a next generation NodeB (gNB) or a next generation enhanced NodeB (ng-eNB). Optionally, in any one of the above-mentioned examples, or in another example, the wireless network is a fifth generation (5G) standalone (SA) or a 5G non-standalone (NSA) network architecture. Optionally, in any one of the above-mentioned examples, or in another example, the base station is a Master Node (MN) supporting dual connectivity with a Secondary Node (SN). Optionally, in any one of the above mentioned examples, or in another example, the PDU session establishment procedure includes configuring, by the UE, one or more data radio bearers (DRBs) in the PDU session and negotiating, by the UE, a user plane security activation in accordance with the first integrity protection algorithm and the first encryption algorithm. Optionally, in any one of the above mentioned examples, or in another example, the negotiating the user plane security activation is separately negotiated for each DRB in the one or more DRBs. Optionally, in any one of the above mentioned examples, or in another example, the security command complete message is encrypted using the first encryption algorithm.

In accordance with another embodiment, a method for providing security policy in a wireless network is provided. The method includes transmitting, by a base station, a security command message to a user equipment (UE) including an indication of an integrity algorithm and an indication of an encryption algorithm. The security command message triggers a radio resource control (RRC) traffic signaling protection procedure between the UE and the base station. The method further includes receiving, by the base station, a security command complete message from the UE. The security command complete message triggers a packet data unit (PDU) session establishment procedure to establish a PDU session between the UE and the base station. In one example, the method further includes receiving, by the base station, a user plane security policy indicating activation status of user plane encryption and user plane integrity protection for all data radio bearers (DRBs) associated to the PDU session. In this example, the method further includes transmitting, by the base station, a security policy command to the UE indicating an activation status of user plane encryption and user plane integrity protection for the PDU session. Optionally, in such an example, or in another example, the user plane security policy is received by the base station during the PDU session establishment procedure from a session management function (SMF) node. Optionally, in any one of the above-mentioned examples, or in another example, RRC downlink encryption at the base station begins after transmitting the security command message. Optionally, in any one of the above-mentioned examples, or in another example, the method further includes verifying, by the base station, the security command complete message. In this example, the RRC uplink encryption at the base station begins after receiving and successfully verifying the security command complete message. Optionally, in any one of the above-mentioned examples, or in another example, the method further includes receiving, by the base station, a list of algorithms from an access management function (AMF) node including a list of integrity algorithms and a list of ciphering algorithms supported by the UE. Optionally, in any one of the above-mentioned examples, or in another example, the method further includes selecting, by the base station, the integrity algorithm corresponding to a highest priority integrity algorithm present in a configured list of the base station and supported by the UE. In this example, the method further includes selecting, by the base station, the encryption algorithm corresponding to a highest priority encryption algorithm present in a configured list of the base station and supported by the UE. Optionally, in any one of the above-mentioned examples, or in another example, the security command message is integrity protected with an RRC integrity key. Optionally, in any one of the above-mentioned examples, or in another example, the security command complete message is integrity protected with the integrity algorithm indicated in the security command message. Optionally, in any one of the above-mentioned examples, or in another example, the security command complete message indicates that the RRC traffic signaling protection procedure has been successfully completed. Optionally, in any one of the above-mentioned examples, or in another example, the security command message is an access stratum (AS) security mode command (SMC). Optionally, in any one of the above-mentioned examples, or in another example, the base station is a next generation NodeB (gNB) or a next generation enhanced NodeB (ng-eNB). Optionally, in any one of the above-mentioned examples, or in another example, the wireless network is a fifth generation (5G) standalone (SA) or a 5G non-standalone (NSA) network architecture. Optionally, in any one of the above-mentioned examples, or in another example, the base station is a Master Node (MN) supporting dual connectivity with a Secondary Node (SN). Optionally, in any one of the above-mentioned examples, or in another example, the security command complete message is encrypted using the encryption algorithm.

In accordance with yet another embodiment, a user equipment (UE) is provided. The UE includes a non-transitory memory storage including instructions and one or more processors in communication with the non-transitory memory storage. The one or more processors execute the instructions to receive a first security command message from a base station including an indication of a first integrity protection algorithm and an indication of a first encryption algorithm. The first security command message triggers a radio resource control (RRC) traffic signaling protection procedure between the UE and the base station. The one or more processors execute the instructions to transmit a security command complete message to the base station. The security command complete message triggering a packet data unit (PDU) session establishment procedure to establish a PDU session between the UE and the base station. In one example, the RRC traffic signaling protection procedure includes negotiating RRC security activation in accordance with the first integrity protection algorithm and the first encryption algorithm. Optionally, in such an example, or in another example, the first security command message further includes an indication of a second integrity algorithm and an indication of a second encryption algorithm. The PDU session establishment procedure further includes negotiating user plane security algorithms for the PDU session in accordance with the second integrity algorithm and the second encryption algorithm. Optionally, in any one of the above-mentioned examples, or in another example, the one or more processors execute the instructions to receive a second security command message from the base station in response to transmitting the security command complete message. The second security command message includes an indication of a second integrity algorithm and an indication of a second encryption algorithm. The PDU session establishment procedure further includes negotiating user plane security algorithms for the PDU session in accordance with the second integrity algorithm and the second encryption algorithm. Optionally, in any one of the above mentioned examples, or in another example, the one or more processors execute the instructions to receive, during a subsequent PDU session establishment, an indication of a third integrity algorithm and an indication of a third encryption algorithm in RRC signaling used to configure data radio bearers (DRBs) of a subsequent PDU session. The subsequent PDU session has a corresponding PDU establishment procedure comprising negotiating user plane security algorithms for the subsequent PDU session in accordance with the third integrity algorithm and the third encryption algorithm. Optionally, in any one of the above-mentioned examples, or in another example, the one or more processors execute the instructions to receive a security policy command from the base station indicating an activation status of user plane encryption and user plane integrity protection for the PDU session. The one or more processors execute the instructions to activate user plane encryption and user plane integrity protection for the PDU session in accordance with the security policy command. Optionally, in any one of the above-mentioned examples, or in another example, the one or more processors execute the instructions to transmit a list of algorithms to an access management function (AMF) node. The list of algorithms includes a list of integrity algorithms and a list of ciphering algorithms supported by the UE. Optionally, in any one of the above-mentioned examples, or in another example, the first security command message is integrity protected with an RRC integrity key. Optionally, in any one of the above-mentioned examples, or in another example, the security command complete message is integrity protected with the first integrity protection algorithm as indicated in the first security command message. Optionally, in any one of the above-mentioned examples, or in another example, the security command complete message indicates that the RRC traffic signaling protection procedure has been successfully completed. Optionally, in any one of the above-mentioned examples, or in another example, the first security command message is an access stratum (AS) security mode command (SMC). Optionally, in any one of the above-mentioned examples, or in another example, the base station is a next generation NodeB (gNB) or a next generation enhanced NodeB (ng-eNB). Optionally, in any one of the above-mentioned examples, or in another example, the wireless network is a fifth generation (5G) standalone (SA) or a 5G non-standalone (NSA) network architecture. Optionally, in any one of the above-mentioned examples, or in another example, the base station is a Master Node (MN) supporting dual connectivity with a Secondary Node (SN). Optionally, in any one of the above mentioned examples, or in another example, the PDU session establishment procedure includes configuring, by the UE, one or more data radio bearers (DRBs) in the PDU session and negotiating, by the UE, a user plane security activation in accordance with the first integrity protection algorithm and the first encryption algorithm. Optionally, in any one of the above mentioned examples, or in another example, the negotiating the user plane security activation is separately negotiated for each DRB in the one or more DRBs. Optionally, in any one of the above mentioned examples, or in another example, the security command complete message is encrypted using the first encryption algorithm.

In accordance with yet another embodiment, a base station is provided. The base station includes a non-transitory memory storage including instructions and one or more processors in communication with the non-transitory memory storage. The one or more processors execute the instructions to transmit a security command message to a user equipment (UE) including an indication of an integrity algorithm and an indication of an encryption algorithm, the security command message triggering a radio resource control (RRC) traffic signaling protection procedure between the base station and the UE. The one or more processors execute the instructions to receive a security command complete message from the UE, the security command complete message triggering a packet data unit (PDU) session establishment procedure to establish a PDU session between the base station and the UE. In one example, the one or more processors execute the instructions to receive a user plane security policy indicating activation status of user plane encryption and user plane integrity protection for all data radio bearers (DRBs) associated to the PDU session. In this example, the one or more processors execute the instructions to transmit a security policy command to the UE indicating an activation status of user plane encryption and user plane integrity protection for the PDU session. Optionally, in such an example, or in another example, the user plane security policy is received by the base station during the PDU session establishment procedure from a session management function (SMF) node. Optionally, in any one of the above-mentioned examples, or in another example, RRC downlink encryption at the base station begins after transmitting the security command message. Optionally, in any one of the above-mentioned examples, or in another example, the one or more processors execute the instructions to verify the security command complete message. In this example, the RRC uplink encryption at the base station begins after receiving and successfully verifying the security command complete message. Optionally, in any one of the above-mentioned examples, or in another example, the one or more processors execute the instructions to receive a list of algorithms from an access management function (AMF) node including a list of integrity algorithms and a list of ciphering algorithms supported by the UE. Optionally, in any one of the above-mentioned examples, or in another example, the one or more processors execute the instructions to select the integrity algorithm corresponding to a highest priority integrity algorithm present in a configured list of the base station and supported by the UE. In this example, the one or more processors execute the instructions to select the encryption algorithm corresponding to a highest priority encryption algorithm present in a configured list of the base station and supported by the UE. Optionally, in any one of the above-mentioned examples, or in another example, the security command message is integrity protected with an RRC integrity key. Optionally, in any one of the above-mentioned examples, or in another example, the security command complete message is integrity protected with the integrity algorithm indicated in the security command message. Optionally, in any one of the above-mentioned examples, or in another example, the security command complete message indicates that the RRC traffic signaling protection procedure has been successfully completed. Optionally, in any one of the above-mentioned examples, or in another example, the security command message is an access stratum (AS) security mode command (SMC). Optionally, in any one of the above-mentioned examples, or in another example, the base station is a next generation NodeB (gNB) or a next generation enhanced NodeB (ng-eNB). Optionally, in any one of the above-mentioned examples, or in another example, the wireless network is a fifth generation (5G) standalone (SA) or a 5G non-standalone (NSA) network architecture. Optionally, in any one of the above-mentioned examples, or in another example, the base station is a Master Node (MN) supporting dual connectivity with a Secondary Node (SN). Optionally, in any one of the above-mentioned examples, or in another example, the security command complete message is encrypted using the encryption algorithm.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
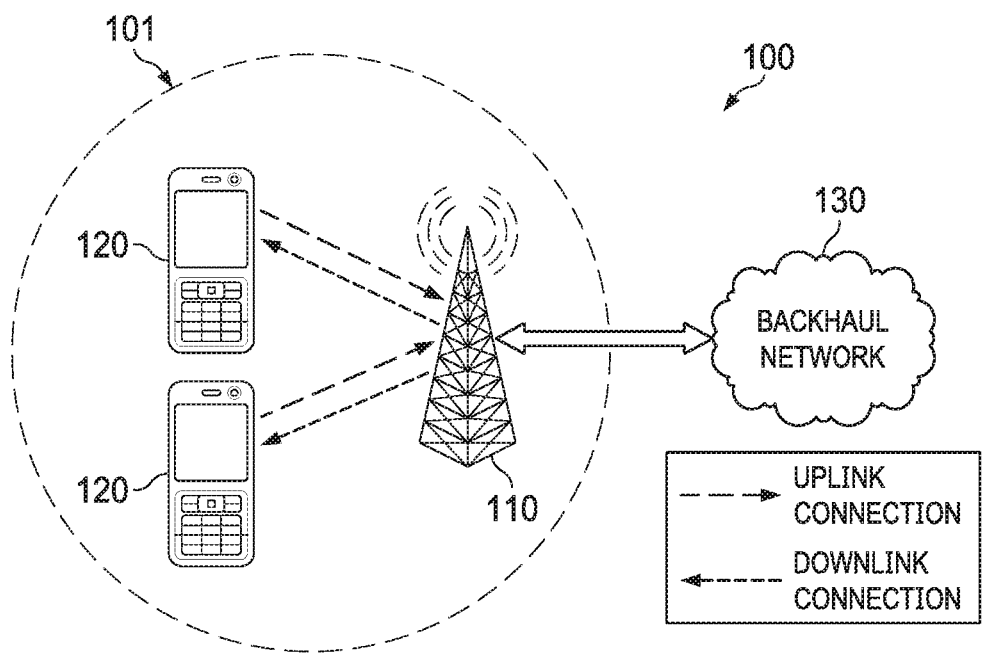
FIG. 1 is a diagram of an embodiment wireless communications network.

This disclosure provides many applicable inventive concepts that can be embodied in a wide variety of specific contexts. The specific embodiments are merely illustrative of specific configurations and do not limit the scope of the claimed embodiments. Features from different embodiments may be combined to form further embodiments unless noted otherwise. Variations or modifications described with respect to one of the embodiments may also be applicable to other embodiments. Further, it should be understood that various changes, substitutions, and alterations can be made herein without departing from the spirit and scope of this disclosure as defined by the appended claims. While the inventive aspects are described primarily in the context of 5G wireless networks, it should also be appreciated that those inventive aspects may also be applicable to 4G and 3G wireless networks.

In Fourth Generation (4G) network architecture, user equipment (UE) registration procedure and user plane establishment occur simultaneously. One bearer (i.e., default bearer) is established during the registration procedure and a Mobility Management Entity (MME) is responsible for session management and authentication/negotiation of security and integrity protection algorithms between the UE and a base station. Furthermore, security algorithms and enablement for both RRC traffic and user plane traffic are negotiated simultaneously during the AS Security Mode Command (SMC) procedure.

Embodiments of this disclosure provide techniques for securely communicating, negotiating, authenticating, activating, and establishing control plane and user plane integrity protection and ciphering algorithms for RRC traffic and user plane traffic between a UE, a base station, and various controlling entities within a fifth generation (5G) network architecture. In 5G network architecture, unlike in 4G network architecture, the UE registration procedure and user plane establishment occur at different times. The establishment, authentication, and activation of the security policy for control plane traffic are performed separately and independently from user plane traffic. 5G New Radio (NR) network architecture employs multiple entities for negotiating and establishing secure communications between the UE and a network in non-access stratum (NAS) and access stratum (AS) layers. The functionality of the single node (i.e., 4G MME or legacy MME) in 4G is spread across these multiple entities (e.g., Session Management Function (SMF), Access Management Function (AMF), Security Anchor Function (SEAF), etc.). As an example, the Security Anchor Function (SEAF) is now responsible for UE authentication and for providing keying material for establishing all UE security contexts.

Aspects of this disclosure provide embodiment security algorithm communications and negotiation procedures between the base station and the UE. In particular, the UE may receive an access stratum security mode command (AS-SMC) from the base station indicating a set of algorithms to be used for integrity protection and/or ciphering. In some embodiments, the AS-SMC may include a single set of algorithms to be used for both user plane traffic and control plane traffic. In some embodiments, the AS-SMC may include separate sets of algorithms to be used for each of user plane traffic and control plane traffic. In other embodiments, the AS-SMC message may be an AS-CP SMC message that includes security algorithms for control plane traffic. In such embodiments, after successful negotiation of control plane traffic security, the UE may receive an AS-UP SMC message from the base station that includes security algorithms for user plane traffic. After the control plane traffic and user plane traffic security negotiation is complete, the UE may receive a separate message indicating activation of integrity protection and/or encryption in user plane traffic for a Packet Data Unit (PDU) session in accordance with the indicated user plane security algorithms.

In some embodiments, the level of encryption and/or integrity protection for all PDU sessions may be the same. The UE may receive a message to enable or activate a particular security policy (i.e., integrity protected or ciphered, or none) corresponding to the set of security algorithms negotiated between the UE and the base station. In some embodiments, different levels of encryption and/or integrity protection can be achieved per PDU session. In one embodiment, the AMF, session management function (SMF), and the policy control function (PCF) entities may determine and communicate different algorithms per PDU session with the base station and the UE. In these embodiments, the UE may receive a separate message indicating an activation or enablement of a user security policy for a data radio bearer (DRB) belonging to a respective PDU session in accordance with the particular user security policy. In some embodiments, the security policy for all DRBs belonging to a same PDU session may be the same.

In other embodiments, methods for communicating security algorithms and negotiation procedures in 5G standalone (SA) and non-standalone (NSA) network architectures are provided. As an example, in a 5G NSA with a 4G core, a master base station (MeNB) may be used to establish a control plane with a UE using the embodiments of this disclosure. The MeNB may then establish a user plane on behalf of a 5G base station (gNB) with the UE using the embodiments of this disclosure. In such an example, the MeNB may offload some of the user plane traffic to the gNB. The gNB provides additional user plane bandwidth for a transitional deployment of 5G access within the core 4G network. As the UE registration procedure in 5G is done separately and independently from the UE PDU session establishment procedure, and with the additional changes to the network architecture, it is therefore advantageous to provide procedures for negotiating security and integrity algorithms in a 5G network architecture. The embodiment procedures described herein can reduce message overhead and provide flexibility for communicating user plane security policy between a base station and a UE. Additionally, these embodiments may provide for establishment of security associations for RRC traffic and user plane traffic in 5G networks and for 4G networks with some 5G base station deployment. These and other details are discussed in greater detail below.

FIG. 1 is diagram of a network 100 for communicating data. The network 100 includes a base station 110 having a coverage area 101, a plurality of UEs 120, and a backhaul network 130. As shown, the base station 110 establishes uplink (dashed line) and/or downlink (dotted line) connections with the UEs 120, which serve to carry data from the UEs 120 to the base station 110 and vice-versa. Data communicated over the uplink/downlink connections may include data communicated between the UEs 120, as well as data communicated to/from a remote-end (not shown) by way of the backhaul network 130. As used herein, the term "base station" refers to any network-side device configured to provide wireless access to a network, such as an enhanced Node B (eNodeB or eNB), a gNB, a transmit/receive point (TRP), a macro-cell, a femtocell, a Wi-Fi Access Point (AP), and other wirelessly enabled devices. Base stations may provide wireless access in accordance with one or more wireless communication protocols, e.g., 5th generation new radio (5G NR), LTE, LTE advanced (LTE-A), High Speed Message Access (HSPA), Wi-Fi 802.11a/b/g/n/ac, etc. As used herein, the term "UE" refers to any user-side device configured to access a network by establishing a wireless connection with a base station, such as a mobility entity (ME), a mobile device, a mobile station (STA), a vehicle, and other wirelessly enabled devices. In some embodiments, the network 100 may include various other wireless devices, such as relays, low power nodes, etc. While it is understood that communications systems may employ multiple access nodes capable of communicating with one or multiple UEs, only one access node, and two UEs are illustrated for simplicity and more may be contemplated.

Figures 2A, 2B:
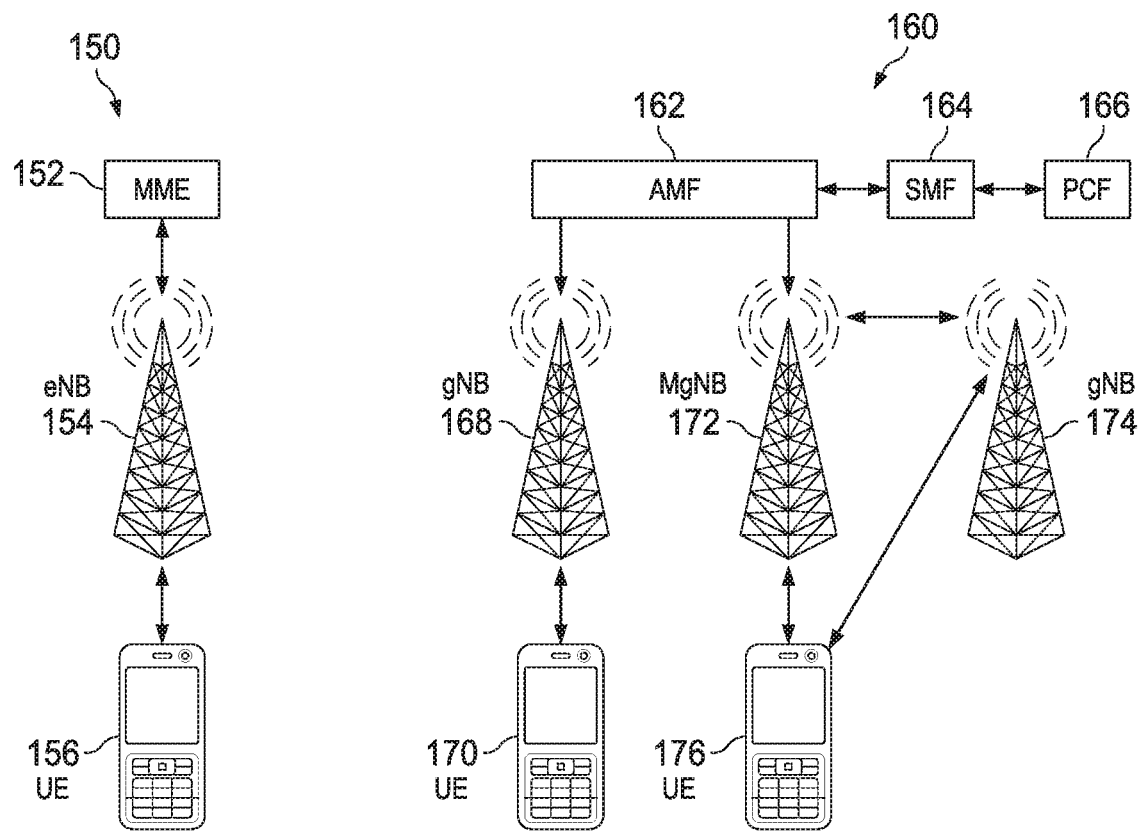
FIG. 2A is a diagram of an embodiment 4G network architecture.
FIG. 2B is a diagram of an embodiment 5G network architecture.

FIG. 2A is a simplified diagram of a network 150 for communicating data in a 4G network. The network 150 includes a MME 152 in communication with a base station (e.g., enhanced Node-B (eNB)) 154. The base station 154 is in communication with a UE 156. In the network 150, the registration procedure and the user plane establishment occur simultaneously during UE attachment (i.e., network registration) with the network. The MME 152 is a single core network node or entity that handles session management, which acts as an access security management entity (ASME) for authentication. The MME 152 is also an anchor (i.e. load) for the network to handle mobility, security, and to establish a user plane for the UE 156.

The LTE authentication and non-access stratum (NAS) security protocols are performed sequentially, during which time mutual authentication is established between the UE 156 and the serving network 150 and NAS layer encryptions keys are generated. In particular, the UE 156 sends an International Mobile Subscriber Identity (IMSI) to the MME 152 in the serving network 150. The MME 152 then sends the IMSI to a home subscriber (HSS) in a home network of the UE 156, which generates Evolved Packet System (EPS) authentication vectors. The EPS authentication vectors are then communicated to the MME 152, where they are used to authenticate the UE 156 and generate NAS layer encryption keys in accordance with an authentication and key agreement (AKA) procedure. Thereafter, the NAS layer encryption keys are used to encrypt signaling exchanged between the UE 156 and the MME 152.

During the UE registration and authentication, the eNB 154 negotiates AS security (i.e., over the air security) with the UE 156. Generally the MME 152, the eNB 154, and the UE 156 are each capable of supporting multiple security algorithms. However, the list of supported algorithms by each entity may differ, for example due to different algorithms being supported by different manufacturers. As a result, the security algorithm negotiated between the MME 152 and the UE 156 for NAS communication may not be supported by the eNB 154. Therefore, the UE 156 and the eNB 154 may need to separately negotiate security algorithms and security parameters for RRC traffic and user plane traffic. Access stratum using AS security keys provides for secure delivery of Radio Resource Control (RRC) messages between the UE 156 and the eNB 154 in the control plane for a Signaling Radio Bearer (SRB) connection and for secure delivery of internet protocol (IP) packets in the user plane for a DRB connection. RRC messages use the RRC protocol to communicate control messages between the UE 156 and the eNB 154 for allocating resources, etc. Generally, RRC traffic is stricter with an associated enhanced security in comparison with user plane traffic. As the control plane signaling controls the behavior of the UE 156, the security associated with the communication path between the eNB 154 and the UE 156 is increased to further ensure authentic communication.

In 4G architecture, one default bearer is established during the UE registration or attach procedure, which directly ensures user plane transmission at the end of the attach procedure. The eNB 154, or a similar entity, negotiates control plane access stratum and user plane access stratum algorithms with the UE 156 during the initial UE registration procedure. In an embodiment, the eNB 154 negotiates encryption and integrity protection algorithms for both user plane protocol and for control plane protocol. It is noted that the security algorithms selected for RRC traffic are also the security algorithms selected for user plane traffic.

The eNB 154 sends an AS-SMC message to the UE 156 indicating an integrity protection algorithm and an encryption algorithm. The integrity protection algorithm and the encryption algorithm are selected by the eNB 154 from a list of algorithms supported by both the UE 156 and the eNB 154 with the highest priority. The list of algorithms that are supported by the UE 156 are initially signaled to the MME 152, which is then sent to the eNB 154. The AS-SMC is integrity protected and can be authenticated by the UE 156 using a key derived between the UE 156 and the MME 152 for the eNB 154. In addition, the AS-SMC procedure simultaneously activates the security for both RRC signaling and user plane signaling. In other words, at the completion of the AS-SMC procedure, the UE 156 has a security context with the eNB 154, a secret key for RRC integrity protection, a secret key for RRC encryption, and a secret key for user plane encryption. The inclusion of an encryption algorithm and an integrity protection algorithm in the AS-SMC message indicates the enablement and the requirement for encryption and integrity protection of the control plane traffic and the encryption of the user plane traffic by the UE 156. It should be noted that in 4G, user plane integrity protection is not supported. As an example, if the eNB 154 includes a 128 E-UTRAN Encryption Algorithm Number 1 (128-EEA1) in the AS-SMC message, the eNB 154 is indicating to the UE 156 to use the 128-EEA1 algorithm and enable encryption for RRC traffic and for user plane packets.

FIG. 2B is a diagram of a network 160 for communicating data in a 5G network. The network 160 includes multiple security entities—Access Management Function (AMF) 162, Session Management Function (SMF) 164, Policy Control Function (PCF) 166, several 5G base stations 168, 172, 174, and multiple UEs 170, 176. In FIG. 2B, the 5G base station 172 is a Master base station (MgNB) for the secondary 5G base station (gNB) 174. In some embodiments gNB 174 may be used as an additional data packet communication path used in user plane traffic and MgNB 172 may be used in RRC traffic and/or user plane traffic. In the embodiments that follow, the disclosure references gNB 168, however, the embodiments may also include cases where the control plane traffic is established between the UE 176 and the MgNB 172 and user plane traffic is established between the UE 176 and MgNB 172 and gNB 174. Additional components may be added or removed from the network 160 and the illustrated components, the connections, and the quantity of each component is selected to simplify the discussion.

The Security Anchor Function (SEAF), co-located with the AMF 162, is responsible for UE authentication and for providing keying material for establishing all UE security contexts. The AMF 162 is responsible for the management of the UE registration session and related location and mobility management functions within the core network when moving from one anchor load to a next (e.g., access point of attachment changes, etc.). The SMF 164 is responsible for management of user plane PDU session establishment and management.

In the Third Generation Partnership Project (3GPP) 5G architecture, it has been agreed upon that user plane integrity protection and user plane encryption is decided per PDU session. As an example, the first PDU session establishment is determined after the completion of the initial registration. In some embodiments, the integrity protection status and/or encryption may be decided by the SMF 174 and communicated to the UE 170 176 and the next generation Node B (gNB) 168 172 or a similar entity during the first PDU session establishment procedure. In some embodiments, subsequent PDU sessions may have different security associations per PDU session. Therefore, in addition to the additional entities found in 5G, the UE registration procedure is completely separate and independent from the packet data unit (PDU) session establishment procedure. As a result, the negotiation of control plane and user plane security algorithms in 5G network architecture is no longer as straightforward as that in the 4G network architecture.

Generally, the UE capability includes a UE radio capability and a UE network capability. The UE radio capability is applied between the UE 170 and the gNB 168 and is primarily embodied in an access stratum characteristics supported by the UE for access stratum. The UE network capability is applied between the UE 170 and the AMF 162, including security capability of the UE 170 in the NAS & AS, and is embodied in a security algorithms list supported for the NAS and AS. In 5G, non-access stratum security is associated between the UE 170 and the AMF 162. The pair negotiates security association during the registration procedure, which includes the communication of the list of algorithms supported by the UE 170 to the AMF 162. As an example, UE 170 may indicate to the network 160 that it supports algorithms 1 through 4. The network 160 in turn may support algorithms 0, 1, and 5—with number 0 being the highest priority. As the UE 170 does not support algorithm 0, the next priority algorithm that is supported by both the UE 170 and the network 160 is algorithm 1. Thus, the AMF 162 indicates to the UE 170 which algorithm is to be used for securing the session over a NAS protocol.

Similarly, a security negotiation procedure is to be completed between the gNB 168 and the UE 170. When AS security context is to be established, the AMF 162 sends the UE security capabilities to the gNB 168. The gNB 168 selects the highest priority algorithms from the list of integrity algorithms and the list of encryption algorithms that is supported by both the UE 170 and the gNB 168.

Figure 3:
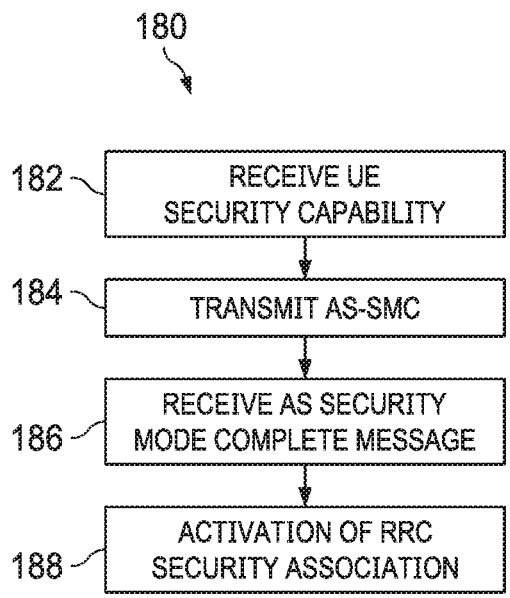
FIG. 3 is a flow diagram of an embodiment operation in a base station for negotiating integrity and encryption algorithms.

FIG. 3 illustrates a flow diagram 18o of an embodiment operation for negotiating integrity and encryption algorithm as may be performed by a 5G base station (gNB) 168. The gNB 168 is configured with a list of supported security algorithms prioritized by the network operator. In some embodiments, the list of security algorithms includes a separate list for integrity protection algorithms and a separate list for encryption algorithms. The embodiments that follow are described with respect to the network 160, however, this is not a limiting case, and the embodiments may apply to other 5G networks. At step 182, the gNB 168 receives the 5G security capabilities of the UE 170 from the AMF 162 for establishing an AS security context. The gNB 168 selects the highest priority encryption algorithm from its configured list also present in the UE 5G security capabilities. In addition, the gNB 168 selects the highest priority integrity protection algorithm from its configured list also present in the UE 5G security capabilities.

At step 184, the gNB 168 transmits an access stratum security mode command (AS-SMC) message to the UE 170 to indicate the selected integrity protection algorithm for integrity protection and the selected encryption algorithm for ciphering. The AS-SMC message itself is integrity protected with an RRC integrity key. It should be understood that in 5G, an indication of the integrity protection algorithm and the indication of the encryption algorithm in the AS-SMC message is different from an activation or an enablement of integrity protection and ciphering for user plane traffic. The indicated integrity protection algorithm and the indicated encryption algorithm, when activated, may be respectively used for integrity protection and ciphering of user plane traffic and RRC traffic. In some embodiments, the indicated integrity protection algorithm and the indicated encryption algorithm in the AS-SMC may be respectively used for integrity protection and ciphering of RRC traffic. In some embodiments, the AS-SMC message may include separate indications of integrity protection and ciphering for each of user plane traffic and RRC traffic. In some embodiments, the gNB 168 may transmit separate user plane and RRC AS-SMC messages to indicate the integrity protection algorithm and the encryption algorithm to be used, when activated, for integrity protection and ciphering respectively for user plane traffic.

At step 186, in response to the transmission of the AS-SMC message, the gNB 168 may receive a reply from the UE 170 with an AS security mode complete message. The AS security mode complete message is integrity protected with the integrity protection algorithm and encrypted with the encryption algorithm as indicated in the AS-SMC message and the RRC integrity and encryption keys. At step 188, the gNB 168 verifies the AS security mode complete message and if the message is successfully verified, the gNB 168 activates the RRC security association.

Figure 4:
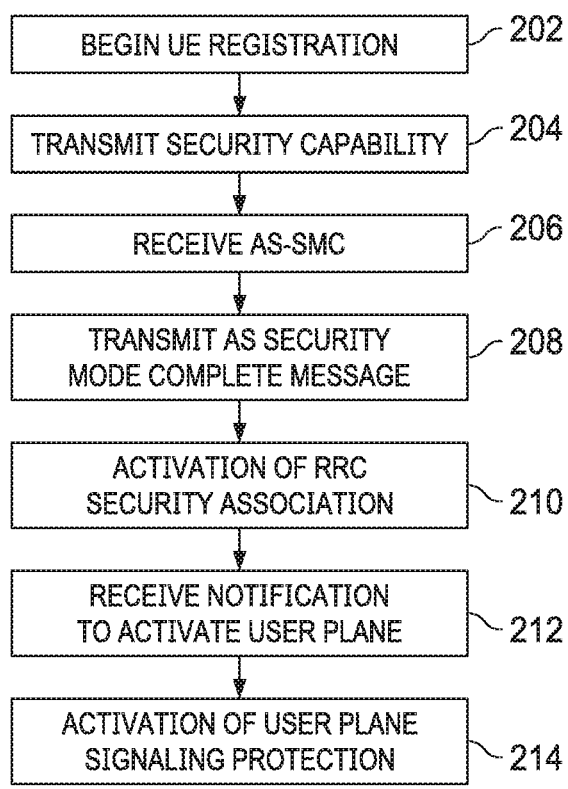
FIG. 4 is a flow diagram of an embodiment operation in a mobility entity for negotiating integrity and encryption algorithms.

FIG. 4 illustrates a flow diagram 200 of an embodiment operation for negotiating integrity and encryption algorithm as may be performed by a UE 170. The embodiments that follow are described with respect to the network 160, however, this is not a limiting case, and the embodiments may apply to other 5G networks. At step 202, the UE 170 begins registration with the network 160, which includes transmitting an ATTACH or Registration REQUEST message to the AMF 162. The access stratum encryption and integrity protection algorithms are selected by the gNB 168 during the AS-SMC procedure. The algorithms indicate to the UE 170 the type of encryption and integrity protection the UE 170 is to use for RRC traffic and user plane traffic, when activated. The activation of user plane encryption and/or integrity protection is per PDU session and is enabled during the PDU session establishment.

At step 204, the UE 170 communicates its 5G security capabilities to the AMF 162. The 5G security capabilities include both Long Term Evolution (LTE) and New Radio (NR) security algorithms. When AS security context is to be established between the gNB 168 and the UE 170, the AMF 162 sends the 5G security capabilities to the gNB 168.

At step 206, the UE 170 receives an AS-SMC message from the gNB 168 indicating the selected integrity protection algorithm for integrity protection and the selected encryption algorithm for ciphering from the gNB 168. At step 208, the UE 170 replies to the gNB 168 with a AS security mode complete message, which is integrity protected with the RRC integrity key and the selected integrity protection algorithm indicated in the AS-SMC message from step 206.

At step 210, the RRC security association is activated between the UE 170 and the gNB 168. RRC uplink encryption or ciphering at the UE 170 is activated after sending the AS security mode complete message to the gNB 168 in step 208. Additionally, RRC uplink deciphering or decryption at the UE 170 is activated after receiving and successful verification of the AS-SMC message received at step 206.

At step 212, the UE 170 may receive a notification to activate user plane for a PDU session. The activation of the user plane integrity and encryption or ciphering is done as part of the DRB addition procedure using the RRC connection reconfiguration procedure and is separate from the activation of the RRC security association in step 210. Initially, the SMF 164 sends the user plane security policy to the gNB 168 during the PDU session establishment procedure. The user plane security policy indicates the activation status (enabled or disabled) for DRBs belonging to the PDU session. The user plane security policy is used to activate the user plane encryption and/or user plane integrity protection for all the DRBs belonging to the PDU session. In some embodiments, the UE 170 may receive an indication in a HANDOVER COMMAND from a target gNB that the user plane integrity protection and/or encryption is to be enabled for a PDU session. At step 214, in response to receiving the indication to enable user plane integrity protection and/or encryption, the UE 170 may activate user plane traffic protection.

In an embodiment, the SMF 164 may communicate to the UE 170 and the gNB 168 that a specific PDU session may not be encrypted. As a result, the UE 170 and gNB 168 may ignore the user plane encryption algorithm selected by the gNB 168 during the AS-SMC procedure and may use the Next Generation (5G) Encryption Algorithm No. 1 (NEA0) algorithm instead. The NEA0 algorithm indicates NULL or no encryption for user plane traffic for the PDU session. In some embodiments, the gNB 168 may select NEA0 as the user plane encryption algorithm during the AS-SMC procedure. As a result, the UE 170 may consider this an indication that user plane encryption is supported using the NULL Algorithm on all PDU sessions while connected to gNB 168. In an embodiment, the SMF 164 may communicate to the UE 170 and the gNB 168 that a specific PDU session may not be integrity protected. As a result, the UE 170 and the gNB 168 may ignore the integrity protection algorithm communicated by the gNB 168 during the AS-SMC procedure and may not use integrity protection for this particular user plane PDU session. This is similar to using the NIA-NULL algorithm.

Figure 5:
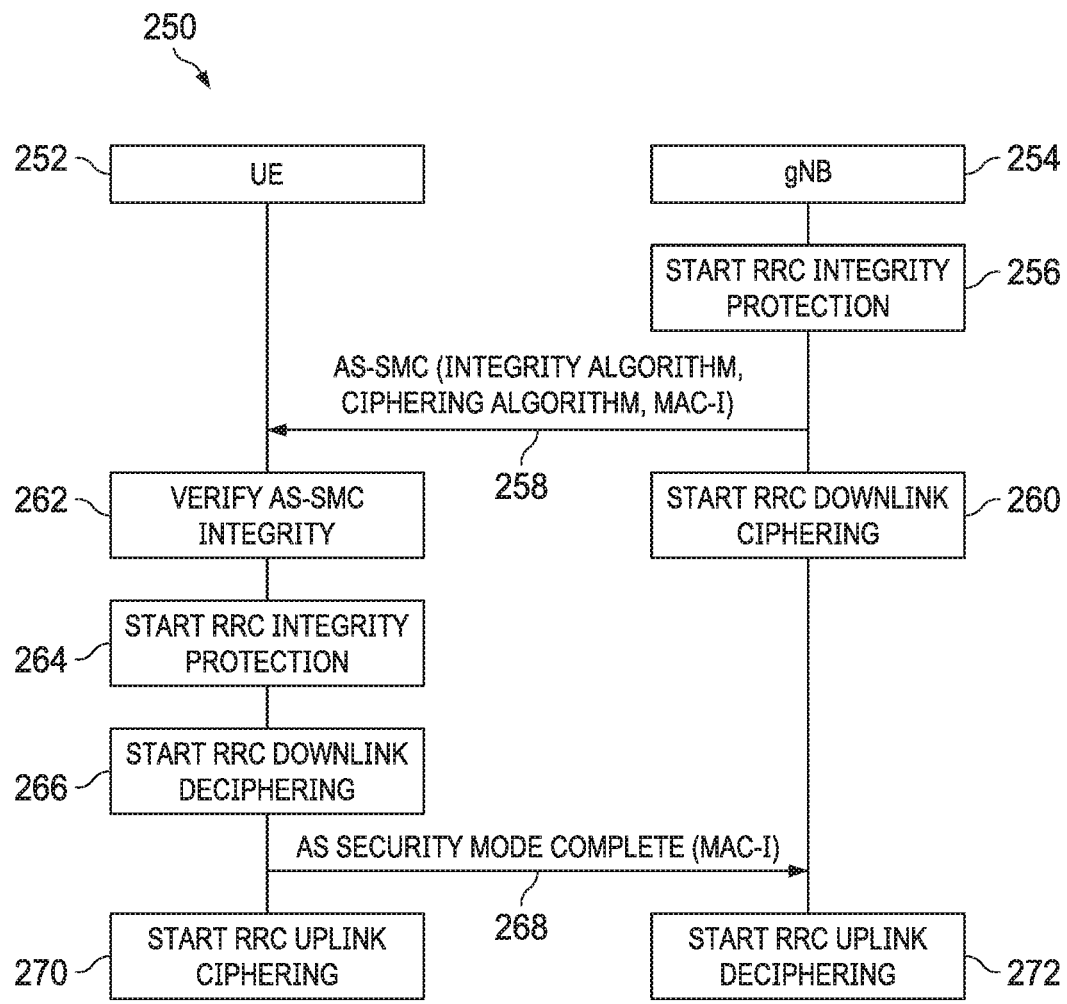
FIG. 5 is a flow diagram of an embodiment operation between a base station and a mobility entity for negotiating integrity and encryption algorithms.

FIG. 5 illustrates a flow diagram 250 of an embodiment operation between a 5G base station (gNB) 254 and a UE 252 for negotiating RRC integrity protection and encryption algorithms. In this embodiment, the AS-SMC message from the gNB 254 to the UE 252 is similar to the AS-SMC message in 4G for communicating encryption and integrity protection algorithms. However, in this embodiment operation the security negotiation between the gNB 254 and the UE 252 encompasses the negotiation and activation of the security association for RRC traffic and not the activation of a security association for user plane traffic.

At step 256, the gNB 254 begins an RRC integrity protection procedure to establish a security association between the gNB 254 and the UE 252. At step 258, the gNB 254 sends an AS-SMC message to the UE 252 to begin negotiation of security algorithms. The AS-SMC message includes an integrity protection algorithm and a ciphering or encryption algorithm signed (integrity protected) with a MAC-I signature. The integrity protection algorithm and the encryption algorithm, when activated, may be respectively used for integrity protection and ciphering of user plane traffic and RRC traffic. The AS-SMC message is integrity protected with an RRC integrity key. The root key (KgNB) for RRC integrity key is received by the gNB 254, from the AMF 162, to protect signaling with the UE 252. The UE 252 derives the same RRC integrity key during the authentication procedure with the AMF 162 and the SEAF.

At step 260, the gNB 254 starts RRC downlink ciphering or encryption after sending the AS-SMC message to the UE 252. At step 262, the UE 252 verifies the integrity of the received AS-SMC message using its derived RRC integrity key. The successful verification of the AS-SMC message by the UE 252 indicates that the transmitting entity (i.e., gNB 254) has possession of the same RRC integrity key as the UE 252.

At step 264, after the UE 252 successfully verifies the integrity of the AS-SMC message, the UE 252 can use integrity protection to communicate RRC traffic with the gNB 254. At step 266, after successfully validating the AS-SMC message, the UE 252 can trust the deciphering algorithm and derives a ciphering key based on the deciphering algorithm.

At step 268, the UE 252 sends the AS security mode complete message with a MAC-I signature. This message indicates that the AS-SMC message has been successfully validated. The AS security mode complete message is encrypted with the encryption algorithm and integrity protected with the integrity protection algorithm indicated in the AS-SMC message. At the completion of this step, the UE 252 and the gNB 254 have successfully validated the derivation of the integrity protection and the encryption keys used for RRC traffic. At step 270, the UE 252 can start RRC uplink ciphering after sending the AS security mode complete message. At step 272, the gNB 254 can start RRC uplink deciphering or decryption after receiving and successfully verifying the AS security mode complete message from the UE 252.

At the completion of the embodiment operation of FIG. 5, the security association for RRC traffic has been established and activated. However, user plane security activation is not yet established, since in 5G the activation of security for user plane traffic is separate from activation of security for control plane traffic. In some embodiments, the UE 252 may use the same encryption algorithms and integrity protection algorithms communicated and negotiated in the AS-SMC message in step 258 for the user plane encryption and the user plane integrity protection. The UE 252 may then derive the encryption security key and integrity protection key based on the security algorithms indicated in the AS-SMC message. The activation and enablement of the user plane encryption and integrity protection for a PDU session, however, may be separately signaled or indicated to the UE 252. The activation of the security association is moved to the configuration of the DRB. The user plane security policy for a PDU session is provided by the SMF 174 to the gNB 254 during the PDU session establishment. The user plane security policy indicates whether the user plane integrity protection and/or user plane encryption is to be enabled or disabled for all data radio bearers (DRBs) belonging to the PDU session. The gNB 254, after receiving the user plane security policy for the PDU session, may then activate user plane integrity protection and/or user plane encryption, using RRC signaling, for each DRB.

Figure 6:
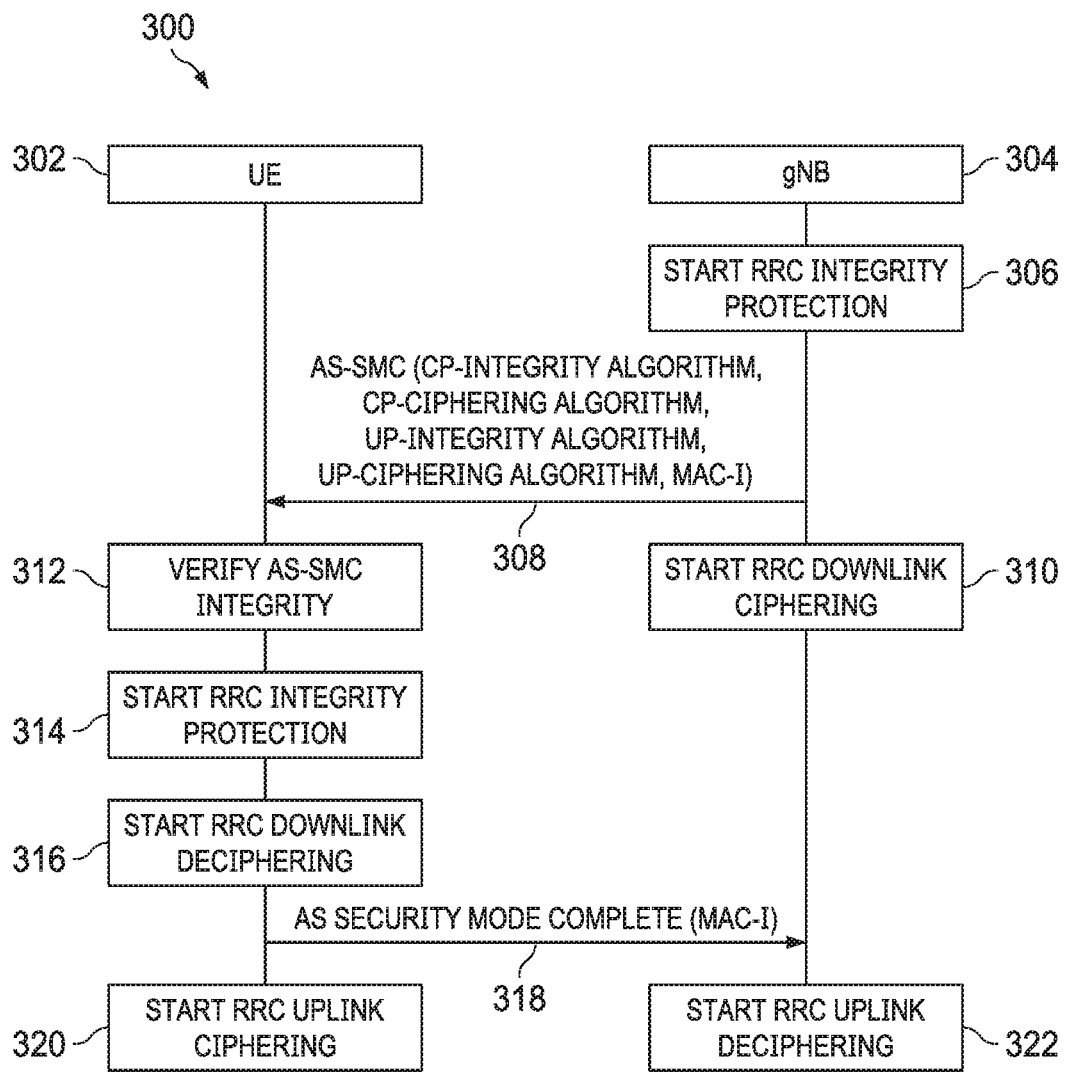
FIG. 6 is a flow diagram of another embodiment operation between a base station and a mobility entity for negotiating integrity and encryption algorithms.

FIG. 6 illustrates a flow diagram 300 of an embodiment operation between a 5G base station (gNB) 304 and a UE 302 for negotiating RRC integrity protection and encryption algorithms. In this embodiment, the AS-SMC message includes separate integrity protection algorithms for RRC traffic (i.e., control plane (CP)) and for user plane (UP) traffic. The separation of the indication for security algorithms to be used for RRC traffic and for user plane traffic in the embodiment of FIG. 6, in comparison to the embodiment of FIG. 5, may advantageously provide additional flexibility in selecting different algorithms for each of user plane traffic and RRC traffic.

At step 306, the gNB 304 begins the RRC integrity protection procedure to establish a security association between the gNB 304 and the UE 302. At step 308, the gNB 304 sends an AS-SMC message to the UE 302 to begin negotiating security algorithms. The AS-SMC message in the embodiment of FIG. 6 includes a control plane integrity protection algorithm (CP-Integrity Algorithm), a control plane encryption algorithm (CP-Ciphering Algorithm), a user plane integrity protection algorithm (UP-Integrity Algorithm), and a user plane encryption algorithm (UP-Ciphering Algorithm). The CP-Integrity Algorithm is used to integrity protect the control plane traffic (i.e., RRC traffic) between the gNB 304 and the UE 302. The CP-Ciphering Algorithm is used to cipher or encrypt the RRC traffic between the gNB 304 and the UE 302. The UP-Integrity Algorithm, upon activation, is used to integrity protect user plane traffic at the UE 302. The UP-Ciphering Algorithm, upon activation, is used to encrypt user plane traffic at the UE 302. In some embodiments, the AS-SMC message may have the same format as the AS-SMC message in 4G but with a new indication to indicate separate security indicators for RRC traffic and for user plane traffic. In some embodiments, the AS-SMC message may be a new type of message. In either embodiment, the user plane receives an indication that the message includes separate algorithms for RRC traffic and for user plane traffic. As an example, information elements in the AS-SMC message may allow the UE 302 to parse the structure of the AS-SMC message to determine the different security algorithm indications within the AS-SMC message.

Each algorithm is selected by the gNB 304, after receiving a list of supported algorithms of the UE 302 from the AMF 162 during the registration procedure as previously described. In some embodiments, the algorithms for control plane traffic may be the same algorithms selected for user plane traffic. In some embodiments, the algorithms for the control plane traffic may be different algorithms than that selected for user plane traffic.

At step 310, upon communicating the AS-SMC message to the UE 302, the gNB 304 begins RRC downlink ciphering. At step 312, the UE 302 verifies the integrity of the AS-SMC message using an RRC integrity key. Successful verification of the AS-SMC message by the UE 302 is an indication that the transmitting entity (i.e., gNB 304) is in possession of the same RRC integrity key. At step 314, the UE 302 may use the control plane integrity protection algorithm, as indicated in the AS-SMC message, in RRC related communications with the gNB 304 after verification of the AS-SMC message at step 312. Additionally, the successful validation of the AS-SMC message signals a trust in the control plane deciphering algorithm, and at step 316, the UE 302 may derive a ciphering key based on the control plane deciphering algorithm.

At step 318, the UE 302 signals an AS security mode complete message to the gNB 352 that may be encrypted with the CP-Ciphering Algorithm and integrity protected with the CP-Integrity Algorithm as indicated in the AS-SMC message received at step 308. At step 320, after successful validation of the derivation of the integrity protection and encryption keys used for RRC traffic and upon communicating the AS security mode complete message to the gNB 304, the UE 302 may begin RRC uplink ciphering. At step 322, the gNB 304 can start RRC uplink deciphering (i.e., decryption) after receiving and successfully verifying the AS security mode complete message from the UE 302.

At the completion of the embodiment operation of FIG. 6, the security association for RRC traffic has been established. It is again noted that the user plane security activation is a separate procedure in 5G. Although the UE 302 has received the UP-Integrity Algorithm and the UP-Ciphering Algorithm from the gNB 304, the user plane policy for a PDU session is separately established.

Figure 7:
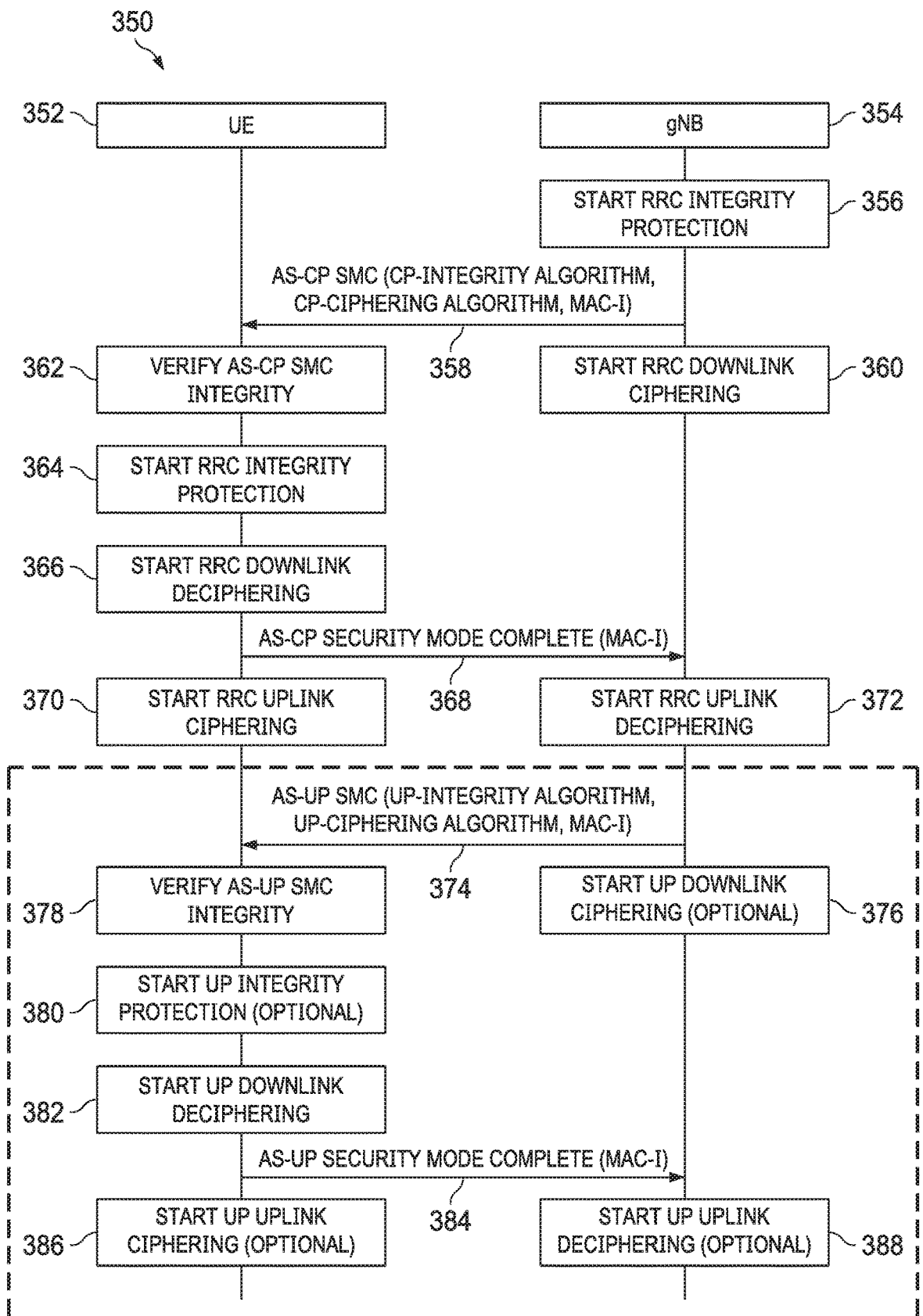
FIG. 7 is a flow diagram of yet another embodiment operation between a base station and a mobility entity for negotiating integrity and encryption algorithms.

FIG. 7 illustrates a flow diagram 350 of an embodiment operation between a 5G base station (gNB) 354 and a UE 352 for negotiating RRC integrity protection and encryption algorithms. In this embodiment, the gNB 354 sends separate AS-SMC messages (AS-CP SMC and AS-UP SMC) at different times to indicate the integrity protection algorithms and the encryption algorithms to be used, when activated, for each of RRC traffic and user plane traffic. The separation of the indication for security algorithms to be used for RRC traffic and user plane traffic in the embodiment of FIG. 7, in comparison to the embodiment of FIG. 6, may advantageously reduce overhead while retaining flexibility, when indicating security algorithms.

At step 356, the gNB 354 begins RRC integrity protection procedure to establish a security association between the gNB 354 and the UE 352. At step 358, the gNB 354 sends an AS-CP SMC message to the UE 352 to begin negotiating security algorithms. The AS-CP SMC message in the embodiment of FIG. 7 includes a control plane integrity protection algorithm (CP-Integrity Algorithm) and a control plane encryption algorithm (CP-Ciphering Algorithm). The CP-Integrity Algorithm is used to integrity protect the control plane traffic (i.e., RRC traffic) between the gNB 354 and the UE 352. The CP-Ciphering Algorithm is used to cipher or encrypt the RRC traffic between the gNB 354 and the UE 352. In some embodiments, the AS-CP SMC message may have the same format as the AS-SMC message in 4G but with a new indication indicating that the integrity protection and encryption algorithms included in the message are labeled for control plane traffic. In some embodiments, the AS-CP SMC message may be a new type of message labeled as AS-CP SMC. In either example, the user plane receives an indication that the integrity protection algorithm and the ciphering algorithm in the AS-CP SMC message are to be used for RRC traffic. The CP-Integrity Algorithm and the CP-Ciphering algorithm indicated in the AS-CP SMC message are selected by the gNB 354, after receiving a list of supported algorithms of the UE 352 from the AMF 162. The AMF 162 may receive the list of supported algorithms of the UE 352 during the registration procedure of the UE 352 with the network. The gNB 354 selects the algorithms in accordance with the highest priority algorithm supported by the gNB 354 and the UE 352.

At step 360, upon communicating the AS-CP SMC message to the UE 352, the gNB 354 begins RRC downlink ciphering. At step 362, the UE 352 verifies the integrity of the AS-CP SMC message using an RRC integrity key. Successful verification of the AS-CP SMC message by the UE 352 is an indication that the transmitting entity (i.e., gNB 354) is in possession of the same RRC integrity key. At step 364, the UE 352 may use the control plane integrity protection algorithm, as indicated in the AS-CP SMC message, in RRC related communications with the gNB 354 after verification of the AS-CP SMC message at step 362. Furthermore, the successful validation of the AS-CP SMC message signals a trust in the control plane deciphering algorithm, and at step 366, the UE 352 derives a ciphering key based on the control plane deciphering algorithm.

At step 368, the UE 352 signals an AS-CP security mode complete message to the gNB 354 that is encrypted with the CP-Ciphering Algorithm and integrity protected with the CP-Integrity Algorithm as indicated in the AS-CP SMC message received at step 358. At step 370, after successful validation of the derivation of the control plane integrity protection and control plane encryption keys used for RRC traffic and upon communicating the AS-CP security mode complete message to the gNB 354, the UE 352 may begin RRC uplink ciphering. At step 372, the gNB 354 can start RRC uplink deciphering (i.e., decryption) after receiving and successfully verifying the AS-CP security mode complete message from the UE 352. At step 390, the UE 352 may establish the security association for user plane traffic during the establishment of a PDU session and after the security association for RRC traffic has been already established with the gNB 354.

At step 374, the UE 352 may receive a separate user plane specific AS-SMC (i.e., AS-UP SMC) message from the gNB 354. The AS-UP SMC message can include a user plane integrity protection algorithm (UP-Integrity Algorithm) and a user plane encryption algorithm (UP-Ciphering Algorithm). The UP-Integrity Algorithm, upon activation, is used to integrity protect user plane traffic at the UE 352. The UP-Ciphering Algorithm, upon activation, is used to encrypt user plane traffic at the UE 352. The AS-UP SMC message may be integrity protected with the RRC integrity key based on a current AMF key ($K_{AMF}$) and the control plane integrity algorithm.

At step 376, after the gNB 354 transmits the AS-UP SMC message to the UE 352, the gNB 354 may optionally start user plane (UP) downlink ciphering. The ciphering of the user plane downlink traffic is in accordance with the security policy for a PDU session. The user plane downlink ciphering (encryption) at the gNB 354 begins after the establishment of the DRB.

At step 378, the UE 352 verifies the integrity of the AS-UP SMC message. The successful verification of the AS-UP SMC message by the UE 352 is an indication that the transmitting entity (i.e., gNB 354) is in possession of the same integrity key. At step 380, the UE 352 may, optionally and if activated, use the user plane integrity protection algorithm and/or ciphering algorithm for user plane traffic. The successful validation of the AS-UP SMC message also signals a trust in the user plane deciphering algorithm, and at step 382, the UE 352 derives a ciphering key based on the user plane deciphering algorithm. User plane downlink deciphering (encryption) at the UE 352 may start after the establishment of the DRB.

At step 384, the UE 352 may transmit an AS-UP security mode complete message to the gNB 354 that is integrity protected with the CP-Integrity Algorithm as indicated in the AS-CP SMC message received at step 358 and the AMF key ($K_{AMF}$). At step 386, the UE 352 begins user plane uplink ciphering after successfully validating the derivation of the user plane integrity protection and user plane encryption keys for user plane traffic and after communicating the AS-UP security mode complete message to the gNB 354. User plane uplink ciphering (encryption) at the UE 352 may start after the establishment of the DRB. At step 388, the gNB 354 can optionally initiate user plane uplink deciphering after receiving and successfully verifying the AS-UP security mode complete message from the UE 352. The user plane uplink deciphering (decryption) at the gNB 354 may start after the establishment of the data radio bearer.

At the completion of the embodiment operation of FIG. 7, the security association for RRC traffic and user plane traffic has been negotiated between the gNB 354 and the UE 352. The activation of the user plane traffic security may be separately indicated during PDU session establishment. In some embodiments, all subsequent PDU sessions can have the same user plane security policy as indicated in the original AS-UP SMC message and the user security policy is not renegotiated for each PDU session. In these embodiments, the AS-UP SMC message is sent once and all PDU sessions may be protected, if activated, using the same encryption algorithm and/or the same integrity protection algorithm as indicated in the AS-UP SMC message.

However, in some embodiments, the gNB 354 may send a second or subsequent AS-UP SMC message with a different UP-Integrity Algorithm and/or UP-Ciphering Algorithm for a second or subsequent PDU session. In some of these embodiments, subsequent AS-UP SMC messages may have the same UP-Integrity Algorithm and/or UP-Ciphering Algorithm as indicated in the first algorithm in the first AS-UP SMC message. The ability to send subsequent AS-UP SMC messages with different algorithms without reregistering the UE with the network gives additional flexibility to the network such that various PDU sessions may have different associated user plane security policies. In these embodiments, during an establishment of a respective PDU session, the gNB 354 may inform the UE 352 with a corresponding user plane encryption algorithm and/or user plane integrity algorithm and whether encryption and/or integrity protection for the PDU session is to be enabled or not. As previously stated, the decision of whether any specific PDU session is to be encrypted and/or integrity protected is made by the SMF during the PDU session establishment procedure. This decision is communicated to both the UE 352 and gNB 354. In some embodiments, the gNB 354 may use RRC signaling in the DRB establishment procedure to communicate with the UE 352 to signal or indicate to the UE 352 that PDU session encryption and/or integrity protection is to be enabled for that particular PDU session.

As an example, after UE registration with the network and establishing the RRC security association, the user security policy indicated in a first PDU session establishment procedure may include a first AS-UP SMC message indicating an encryption algorithm and/or integrity protection algorithm that can handle, for example, 128 bit keys. After activation of the user security policy as indicated in the AS-UP SMC message, the user plane traffic is integrity protected and/or encrypted in accordance with the first AS-UP SMC message. In a subsequent PDU session establishment procedure, the UE may receive a second AS-UP SMC message indicating an encryption algorithm and/or integrity protection algorithm that can handle, for example, 256 bit keys. After activation of the second user security policy as indicated in the second AS-UP SMC message, the user plane traffic is integrity protected and/or encrypted in accordance with the second AS-UP SMC message, which is at a higher level of security. In some embodiments, the completion of a PDU session indicates to the UE that there is expectancy for an updated security policy in a subsequent PDU session with an updated set of algorithms and security associations.

In the embodiments as illustrated in FIGS. 5, 6, and 7, the indication of control plane integrity protection algorithms and/or encryption algorithms in the Access Stratum Security Mode Command (e.g., AS-SMC, AS-CP SMC, etc.) is an indication of the selection of the algorithms and additionally an indication to the UE that, respectively, RRC integrity protection and/or RRC encryption is to be enabled and is to be required for RRC traffic.

Figure 8:
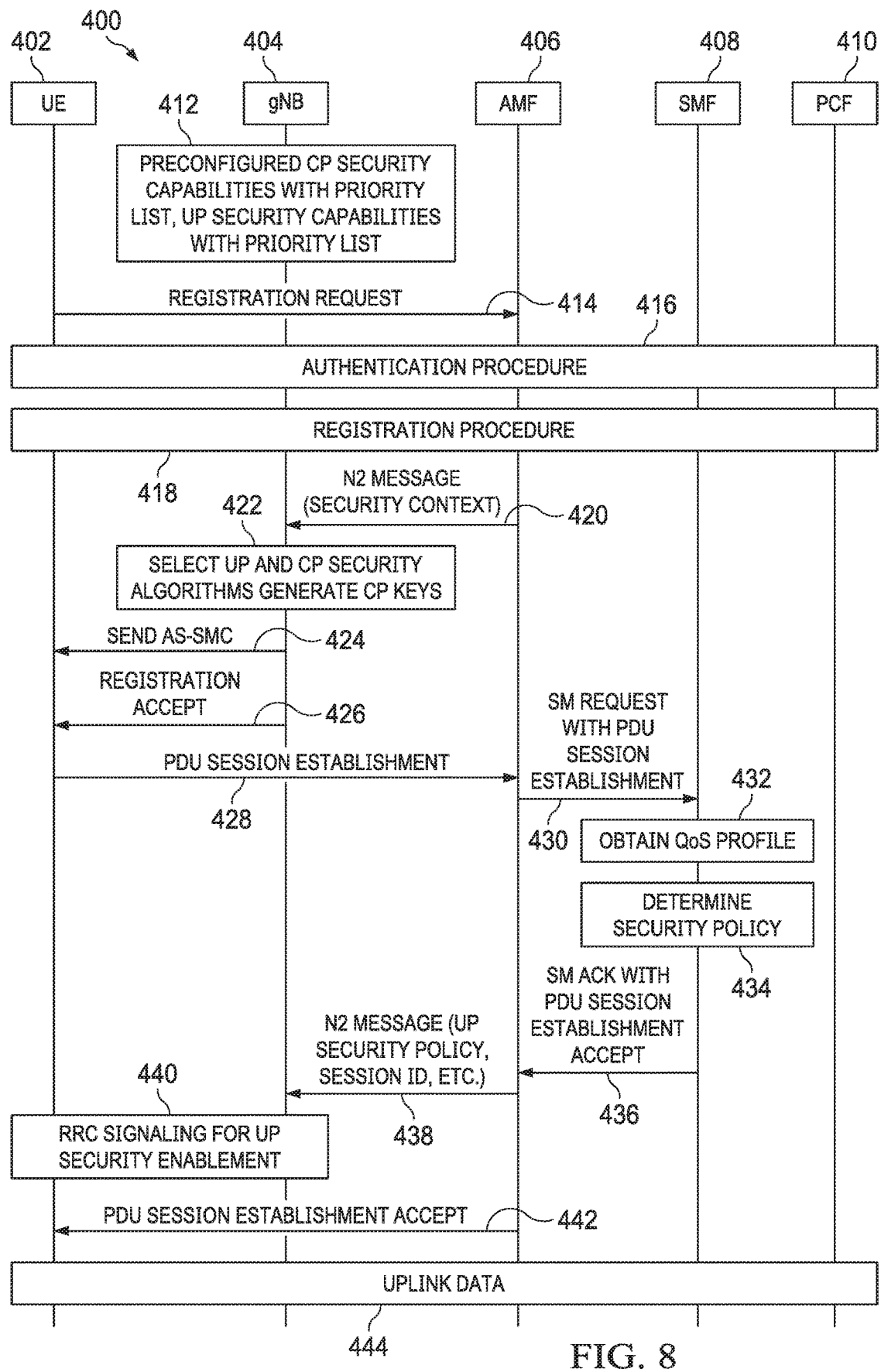
FIG. 8 is a flow diagram of an embodiment operation between a mobility entity, a base station, and several 5G nodes for negotiating integrity and encryption algorithms.

FIG. 8 illustrates a flow diagram 400 of an embodiment operation between a UE 402, a 5G base station (gNB) 404, an AMF entity 406, an SMF entity 408, and a Policy Control Function (PCF) entity 410 for access stratum UE registration and negotiation of RRC integrity protection and encryption algorithms. The PCF 410 is used with the SMF 408 to determine the enabling of user plane integrity protection and/or encryption for a particular PDU session. The PCF 410 includes a database with the available services and security policies associated with the network. The SMF 408 communicates the security policy with the AMF 406, which in turn communicates the security policy to the gNB 404. The gNB 404, when configuring a DRB belonging to a PDU session, communicates the security policy to the UE 402. In some embodiments, the security policy for a second PDU session may have a different security policy configuration. In such an embodiment, the SMF 408 communicates through the AMF 406 and the gNB 404 to the UE 402 the updated user plane security policy.

At step 412, the gNB 404 is pre-configured with a prioritized list of control plane security capabilities (i.e., control plane integrity protection and ciphering) and a with a prioritized list of user plane security capabilities (i.e., user plane integrity protection and ciphering) associated with the gNB 404.

At step 412, the UE 402 transmits an access stratum registration request to the AMF 406 to begin access stratum authentication procedures for the UE 402. At step 416, the authenticity of the UE 402 is verified and upon verification of authenticity, at step 418, the UE registration procedure is started.

At step 420, the AMF 406 communicates an N2 message to the gNB 404 to establish a security context. The AMF 406 communicates a list of 5G UE security capabilities associated with the UE 402. At step 422, the gNB 404 selects the highest priority set of integrity protection and encryption algorithms supported by both the gNB 404 and the UE 402 for control plane traffic (i.e., RRC traffic).

At step 424, the gNB 404 communicates an AS-SMC message to the UE 402 to indicate the selected security algorithms to be used by the UE 402 for RRC traffic. The AS-SMC message may be the AS-SMC message as described in the embodiments of FIG. 5, 6, or 7. In some embodiments, the AS-SMC message may include an indication for the security algorithms used for control plane traffic and user plane traffic using a single algorithm to indicate both set of algorithms. In some embodiments, the AS-SMC message may include separate indications for the security algorithms used for RRC traffic and user plane traffic. In some embodiments, the AS-SMC message may be a control plane (CP) AS-CP SMC message indicating the security algorithms used for control plane traffic.

At step 426, the UE 402 receives the access stratum registration accept message from the gNB 404. At the completion of step 426, the control plane security policy is negotiated between the UE 402 and the gNB 404 and the RRC traffic is protected with the indicated security algorithms in the AS-SMC message.

At step 428, the UE begins a first PDU session establishment with the AMF 406. At step 430, the AMF 406 sends a session management (SM) message request with the PDU establishment request to the SMF 408. At step 432, the SMF 408 obtains a quality of service (QoS) profile and at step 434, the SMF 408 determines the security policy associated with the first PDU session. At step 436, the SMF 408 responds to the request from the AMF 406 with an acknowledgement of the session management (SM) message request and a PDU session establishment accept message.

At step 438, the AMF 406 sends a second message over the N2 communication indicating to the gNB 404 the user security policy to be used for the first PDU session. The N2 message includes the user security policy, the session identifier (ID), etc.

At step 440, RRC signaling in accordance with the security policy activated during the RRC registration procedure is enabled to negotiate and communicate the user plane security algorithms (i.e., user plane integrity protection and user plane ciphering algorithm) to be used for user plane traffic. In some embodiments, the UE 402 may receive an AS-UP SMC message indicating the user plane security algorithms. At step 442, the AMF 406 responds to the PDU session establishment request from step 428 with a PDU session establishment accept message. At step 444, data uplink over the user plane is initiated, and the protection of the data traffic is in accordance with the user plane security policy as indicated during the PDU session establishment. In some embodiments, all following PDU sessions may use the same user plane security algorithms, however, in some of these embodiments, the PDU session may have integrity protection and/or ciphering enabled or disabled. In some embodiments, a second PDU establishment procedure, similar to the first PDU session establishment procedure, which may include an AS-UP SMC message negotiated with the UE 402 to indicate a second set of security algorithms to be used for the second PDU session. Similarly, subsequent PDU sessions may also have a separate PDU session establishment procedure prior to communicating user plane traffic in the respective PDU session.

Figure 9:
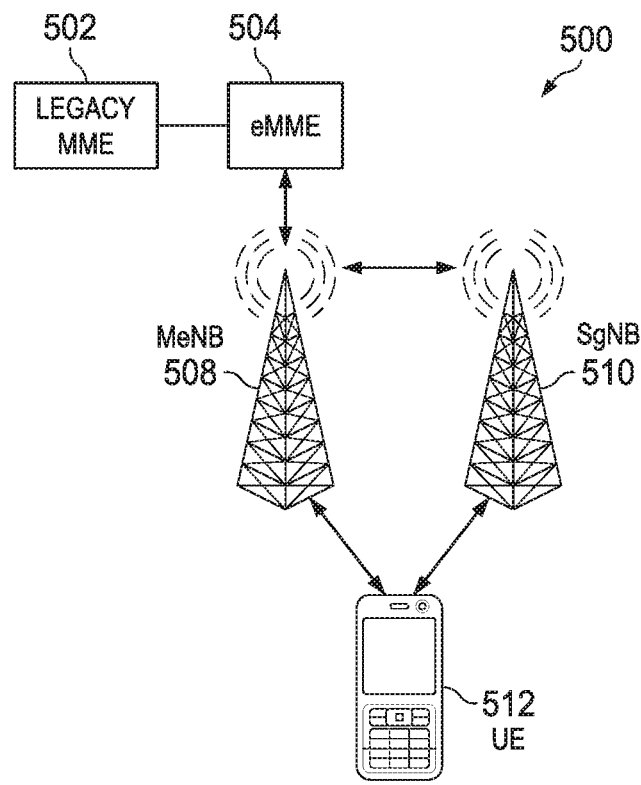
FIG. 9 is a diagram of an embodiment non-standalone (NSA) network architecture.

The embodiments of the disclosure provide mechanisms to negotiate encryption and integrity protection algorithms for both 5G standalone (SA) and for non-standalone (NSA)

network architectures. FIG. 9 illustrates a diagram of a non-standalone (NSA) embodiment network architecture in Evolved Packet System (EPS) having a legacy MME 502 connected to an enhanced MME (eMME) 504. The NSA network also includes a master eNB 508, a secondary SgNB 510, and a UE 512. The particular configuration shown in FIG. 9 is an E-UTRAN New Radio Dual Connectivity (EN-DC) option 3 mode configuration having a core 4G network with some 5G capability. The UE 512 has 4G and NR capabilities and can simultaneously connect to both LTE and 5G NR. The core network is a traditional LTE core network. The legacy MME 502 is used exclusively for communication with LTE base stations (e.g., eNB, MeNB, etc.) and with the eMME 504.

In an example embodiment, the MeNB 508 may negotiate control plane traffic for UE 512 using the embodiments of this disclosure. The MeNB 508 uses an LTE air interface to negotiate security algorithms with the UE 512. The UE 512 may optionally have the capability to connect to multiple base stations for user plane traffic. The MeNB 508 may offload some or all of the user plane traffic to the SgNB 510. The SgNB 510 does not have control plane traffic control with the UE 512. In such an example, the MeNB 508 negotiates user plane traffic for the SgNB 510 (on behalf of the SgNB 510) to establish a user plane and to advantageously use the additional capacity provided by the SgNB 510. The 5G security capabilities of the UE 512 may be transmitted separately from the 4G security capabilities during security association establishment between the MeNB 508 and the UE 512. This may be a deployment case taken by some operators to gradually add 5G access to existing networks.

Figure 10:
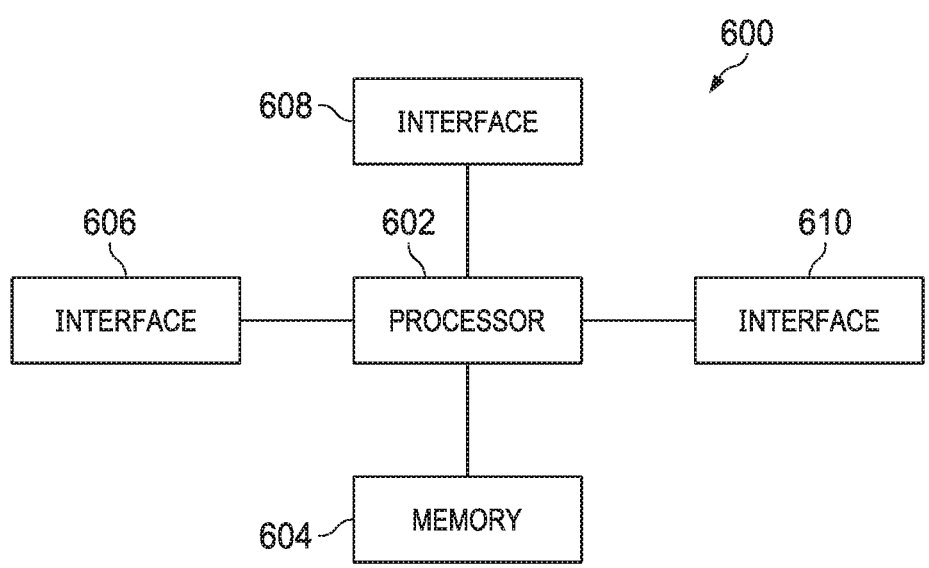
FIG. 10 is a diagram of an embodiment processing system.

FIG. 10 illustrates a block diagram of an embodiment processing system 600 for performing methods described herein, which may be installed in a host device. As shown, the processing system 600 includes a processor 602, a memory 604, and interfaces 606, 608, 610 which may (or may not) be arranged as shown in FIG. 10. The processor 602 may be any component or collection of components adapted to perform computations and/or other processing related tasks, and the memory 604 may be any component or collection of components adapted to store programming and/or instructions for execution by the processor 602. In an embodiment, the memory 604 includes a non-transitory computer readable medium. The interfaces 606, 608, 610 may be any component or collection of components that allow the processing system 600 to communicate with other devices/components and/or a user. For embodiment, one or more of the interfaces 606, 608, 610 may be adapted to communicate data, control, or management messages from the processor 602 to applications installed on the host device and/or a remote device. As another embodiment, one or more of the interfaces 606, 608, 610 may be adapted to allow a user or user device (e.g., personal computer (PC), etc.) to interact/communicate with the processing system 600. The processing system 600 may include additional components not depicted in FIG. 10, such as long-term storage (e.g., non-volatile memory, etc.).

In some embodiments, the processing system 600 is included in a network device that is accessing, or part otherwise of, a telecommunications network. In one embodiment, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), a wireless capable vehicle, a wireless capable pedestrian, a wireless capable infrastructure element or any other device adapted to access a telecommunications network.

Figure 11:
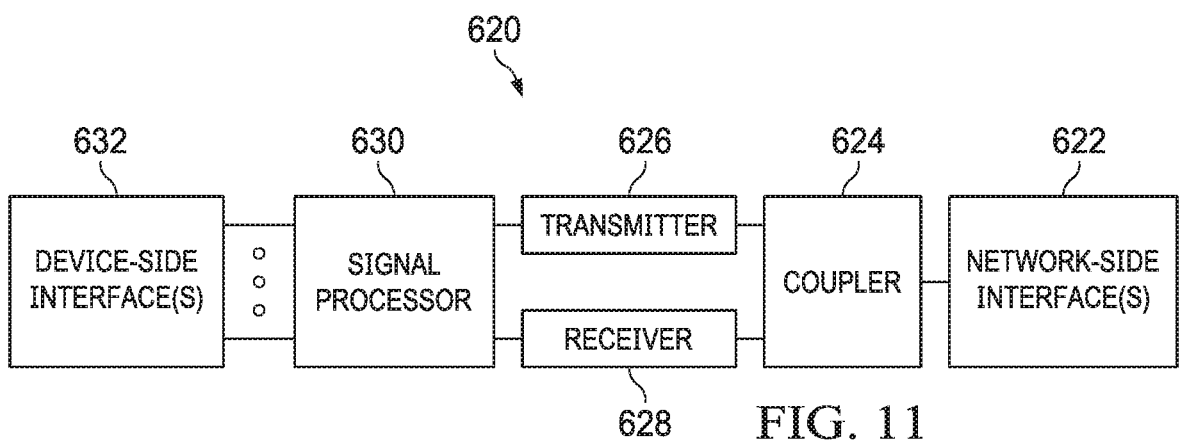
FIG. 11 is a diagram of an embodiment transceiver.

In some embodiments, one or more of the interfaces 606, 608, 610 connects the processing system 600 to a transceiver adapted to transmit and receive signaling over the telecommunications network. FIG. 11 illustrates a block diagram of a transceiver 620 adapted to transmit and receive signaling over a telecommunications network. The transceiver 620 may be installed in a host device. As shown, the transceiver 620 comprises a network-side interface 622, a coupler 624, a transmitter 626, a receiver 628, a signal processor 630, and a device-side interface 632. The network-side interface 622 may include any component or collection of components adapted to transmit or receive signaling over a wireless or wireline telecommunications network. The coupler 624 may include any component or collection of components adapted to facilitate bi-directional communication over the network-side interface 622. The transmitter 626 may include any component or collection of components (e.g., up-converter, power amplifier, etc.) adapted to convert a baseband signal into a modulated carrier signal suitable for transmission over the network-side interface 622. The receiver 628 may include any component or collection of components (e.g., down-converter, low noise amplifier, etc.) adapted to convert a carrier signal received over the network-side interface 622 into a baseband signal. The signal processor 630 may include any component or collection of components adapted to convert a baseband signal into a data signal suitable for communication over the device-side interface(s) 632, or vice-versa. The device-side interface(s) 632 may include any component or collection of components adapted to communicate data-signals between the signal processor 630 and components within the host device (e.g., the processing system 600, local area network (LAN) ports, etc.).

The transceiver 620 may transmit and receive signaling over any type of communications medium. In some embodiments, the transceiver 620 transmits and receives signaling over a wireless medium. In some embodiments, the transceiver 620 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 622 comprises one or more antenna/radiating elements. In some embodiments, the network-side interface 622 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 620 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions, and alterations may be made without departing from the spirit and scope of this disclosure as defined by the appended

What is claimed is:

1. A method for establishing secure communications in a wireless network, the method comprising:
receiving, by a user equipment (UE), a first security command message from a base station comprising an indication of a first integrity protection algorithm and an indication of a first encryption algorithm, the first security command message triggering a radio resource control (RRC) traffic signaling protection procedure between the UE and the base station;
transmitting, by the UE, a security command complete message to the base station, the security command complete message triggering a packet data unit (PDU) session establishment procedure to establish a PDU session between the UE and the base station; and
receiving, by the UE, a second security command message from the base station in response to transmitting the security command complete message, the second security command message comprising an indication of a second integrity algorithm and an indication of a second encryption algorithm, the PDU session establishment procedure for negotiating user plane security algorithms for the PDU session between the UE and the base station in accordance with the second integrity algorithm and the second encryption algorithm.

2. The method of claim 1, wherein the RRC traffic signaling protection procedure comprises negotiating RRC security activation in accordance with the first integrity protection algorithm and the first encryption algorithm.

3. The method of claim 2, wherein the first security command message further comprises an indication of a second integrity algorithm and an indication of a second encryption algorithm, wherein the PDU session establishment procedure further comprises negotiating user plane security algorithms for the PDU session in accordance with the second integrity algorithm and the second encryption algorithm.

4. The method of claim 1, further comprising receiving, by the UE, during a subsequent PDU session establishment, an indication of a third integrity algorithm and an indication of a third encryption algorithm in RRC signaling used to configure data radio bearers (DRBs) of a subsequent PDU session, the subsequent PDU session having a corresponding PDU establishment procedure comprising negotiating user plane security algorithms for the subsequent PDU session in accordance with the third integrity algorithm and the third encryption algorithm.

5. The method of claim 1, further comprising:
receiving, by the UE, a security policy command from the base station indicating an activation status of user plane encryption and user plane integrity protection for the PDU session; and
activating, by the UE, user plane encryption and user plane integrity protection for the PDU session in accordance with the security policy command.

6. The method of claim 1, further comprising transmitting, by the UE, a list of algorithms to an access management function (AMF) node comprising a list of integrity algorithms and a list of ciphering algorithms supported by the UE.

7. The method of claim 1, wherein the first security command message is integrity protected with an RRC integrity key.

8. The method of claim 1, wherein the security command complete message is integrity protected with the first integrity protection algorithm as indicated in the first security command message.

9. The method of claim 1, wherein the security command complete message indicates that the RRC traffic signaling protection procedure has been successfully completed.

10. The method of claim 1, wherein the first security command message is an access stratum (AS) security mode command (SMC).

11. The method of claim 1, wherein the base station is a next generation NodeB (gNB) or a next generation enhanced NodeB (ng-eNB).

12. The method of claim 11, wherein the base station is a Master Node (MN) supporting dual connectivity with a Secondary Node (SN).

13. The method of claim 1, wherein the wireless network is a fifth generation (5G) standalone (SA) or a 5G non-standalone (NSA) network architecture.

14. The method of claim 1, wherein the PDU session establishment procedure comprises:
configuring, by the UE, one or more data radio bearers (DRBs) in the PDU session; and
negotiating, by the UE, a user plane security activation in accordance with the first integrity protection algorithm and the first encryption algorithm.

15. The method of claim 14, wherein the negotiating the user plane security activation is separately negotiated for each DRB in the one or more DRBs.

16. The method of claim 1, wherein the security command complete message is encrypted using the first encryption algorithm.

17. A method for providing security policy in a wireless network, the method comprising:
transmitting, by a base station, a security command message to a user equipment (UE) comprising an indication of an integrity algorithm and an indication of an encryption algorithm, the security command message triggering a radio resource control (RRC) traffic signaling protection procedure between the UE and the base station;
receiving, by the base station, a security command complete message from the UE, the security command complete message triggering a packet data unit (PDU) session establishment procedure to establish a PDU session between the UE and the base station; and
transmitting, by the base station, a second security command message to the UE in response to receiving the security command complete message, the second security command message comprising an indication of a second integrity algorithm and an indication of a second encryption algorithm, the PDU session establishment procedure for negotiating user plane security algorithms for the PDU session between the UE and the base station in accordance with the second integrity algorithm and the second encryption algorithm.

18. The method of claim 17, further comprising:
receiving, by the base station, a user plane security policy indicating activation status of user plane encryption and user plane integrity protection for all data radio bearers (DRBs) associated to the PDU session; and
transmitting, by the base station, a security policy command to the UE indicating an activation status of user plane encryption and user plane integrity protection for the PDU session.

19. The method of claim 18, wherein the user plane security policy is received by the base station during the PDU session establishment procedure from a session management function (SMF) node.

20. The method of claim 17, wherein RRC downlink encryption at the base station begins after transmitting the security command message.

21. The method of claim 17, further comprising verifying, by the base station, the security command complete message, wherein RRC uplink encryption at the base station begins after receiving and successfully verifying the security command complete message.

22. The method of claim 17, further comprising receiving, by the base station, a list of algorithms from an access management function (AMF) node comprising a list of integrity algorithms and a list of ciphering algorithms supported by the UE.

23. The method of claim 22, further comprising:
selecting, by the base station, the integrity algorithm corresponding to a highest priority integrity algorithm present in a configured list of the base station and supported by the UE; and
selecting, by the base station, the encryption algorithm corresponding to a highest priority encryption algorithm present in a configured list of the base station and supported by the UE.

24. The method of claim 17, wherein the security command message is integrity protected with an RRC integrity key.

25. The method of claim 17, wherein the security command complete message is integrity protected with the integrity algorithm indicated in the security command message.

26. The method of claim 17, wherein the security command complete message indicates that the RRC traffic signaling protection procedure has been successfully completed.

27. The method of claim 17, wherein the security command message is an access stratum (AS) security mode command (SMC).

28. The method of claim 17, wherein the base station is a next generation NodeB (gNB) or a next generation enhanced NodeB (ng-eNB).

29. The method of claim 28, wherein the base station is a Master Node (MN) supporting dual connectivity with a Secondary Node (SN).

30. The method of claim 17, wherein the wireless network is a fifth generation (5G) standalone (SA) or a 5G non-standalone (NSA) network architecture.

31. The method of claim 17, wherein the security command complete message is encrypted using the encryption algorithm.

32. A user equipment (UE), comprising:
a non-transitory memory storage comprising instructions; and
one or more processors in communication with the non-transitory memory storage, wherein the one or more processors execute the instructions to:
receive a first security command message from a base station comprising an indication of a first integrity protection algorithm and an indication of a first encryption algorithm, the first security command message triggering a radio resource control (RRC) traffic signaling protection procedure between the UE and the base station;
transmit a security command complete message to the base station, the security command complete message triggering a packet data unit (PDU) session establishment procedure to establish a PDU session between the UE and the base station; and
receive a second security command message from the base station in response to transmitting the security command complete message, the second security command message comprising an indication of a second integrity algorithm and an indication of a second encryption algorithm, the PDU session establishment procedure for negotiating user plane security algorithms for the PDU session between the UE and the base station in accordance with the second integrity algorithm and the second encryption algorithm.

33. A base station, comprising:
a non-transitory memory storage comprising instructions; and
one or more processors in communication with the non-transitory memory storage, wherein the one or more processors execute the instructions to:
transmit a security command message to a user equipment (UE) comprising an indication of an integrity algorithm and an indication of an encryption algorithm, the security command message triggering a radio resource control (RRC) traffic signaling protection procedure between the base station and the UE;
receive a security command complete message from the UE, the security command complete message triggering a packet data unit (PDU) session establishment procedure to establish a PDU session between the base station and the UE; and
transmit a second security command message to the UE in response to receiving the security command complete message, the second security command message comprising an indication of a second integrity algorithm and an indication of a second encryption algorithm, the PDU session establishment procedure for negotiating user plane security algorithms for the PDU session between the UE and the base station in accordance with the second integrity algorithm and the second encryption algorithm.

\* \* \* \* \*